(12) United States Patent
Bremer et al.

(10) Patent No.: US 6,465,059 B1
(45) Date of Patent: Oct. 15, 2002

(54) LIQUID-CRYSTALLINE MEDIUM

(75) Inventors: Matthias Bremer, Darmstadt; Georg Lüssem, Ober-Ramstadt; Dagmar Klement, Gross-Zimmern, all of (DE)

(73) Assignee: Merck Patent Gesellschaft mit Beschrankter Haftung (DE)

( * ) Notice: Subject to any disclaimer, the term of this patent is extended or adjusted under 35 U.S.C. 154(b) by 135 days.

(21) Appl. No.: 09/597,460

(22) Filed: Jun. 19, 2000

(30) Foreign Application Priority Data

Jun. 18, 1999 (DE) .......................................... 199 27 993
Dec. 18, 1999 (DE) .......................................... 199 61 305

(51) Int. Cl.$^7$ ........................ C09K 19/30; C09K 19/34; C09K 19/20; C07C 43/184
(52) U.S. Cl. ............. 428/1.1; 252/299.61; 252/299.63; 252/299.66; 252/299.67; 568/583; 568/664; 568/669; 568/670
(58) Field of Search ................. 252/299.63, 299.61, 252/299.01, 299.66, 299.67; 568/583, 664, 669, 670; 428/1.1

(56) References Cited

U.S. PATENT DOCUMENTS 4,361,494 A * 11/1982 Osman et al. ......... 252/299.63
5,384,065 A * 1/1995 Geelhaar et al. ....... 252/299.63
5,487,845 A * 1/1996 Reiffenrath et al. .... 252/299.63

FOREIGN PATENT DOCUMENTS

DE 19859421 * 6/2000

* cited by examiner

*Primary Examiner*—Shean C. Wu
(74) *Attorney, Agent, or Firm*—Millen, White, Zelano & Branigan, P.C.

(57) ABSTRACT

The invention relates to a liquid-crystalline medium one or more compounds of the general formula IA

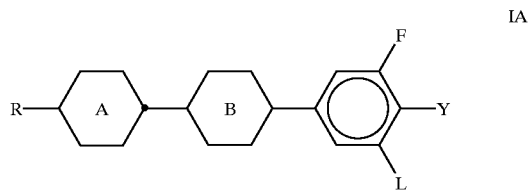

and one or more compounds of the formula IB

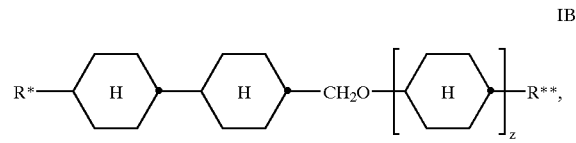

R, R*, R**, z, L and Y are defined herein.

20 Claims, No Drawings

LIQUID-CRYSTALLINE MEDIUM

The present invention relates to a liquid-crystalline medium and to its use for electro-optical purposes and for displays containing said medium.

Liquid crystals are used especially as dielectrics in display devices, as the optical properties of such substances can be affected by a voltage applied. Electro-optical devices on the basis of liquid crystals are very well known to those skilled in the art and can be based on various effects. Examples of such devices include cells with dynamic scattering, DAP cells (deformation of aligned phases), guest/host cells, TN cells having a twisted nematic structure, STN cells (supertwisted nematic), SBE cells (superbirefringence effect) and OMI cells (optical mode interference). The most common display devices are based on the Schadt-Helfrich effect and have a twisted nematic structure.

The liquid crystal materials must have good chemical and thermal stability and good stability with respect to electrical fields and electromagnetic radiation. Additionally, the liquid crystal materials should have a low viscosity and in the cells give rise to short response times, low threshold voltages and high contrast.

Furthermore they should, at standard operating temperatures, i.e. in as wide a range as possible below and above room temperature, have a suitable mesophase, for example a nematic or cholesteric mesophase for the above-mentioned cells. Since liquid crystals as a rule are used as mixtures of a number of components, it is important for the components to be readily miscible with one another. Other properties such as electrical conductivity, dielectric anisotropy and optical anisotropy must meet various requirements, depending on the cell type and field of application. For example, materials for cells having a twisted nematic structure should exhibit positive dielectric anisotropy and low electrical conductivity.

For example, matrix liquid crystal displays (matrix LCDs) comprising integrated nonlinear elements to switch individual pixels ideally require media having large positive dielectric anisotropy, broad-range nematic phases, relatively low birefringence, very high resistivity, good UV and temperature stability and low vapour pressure.

Such matrix liquid crystal displays are known. Suitable nonlinear elements for individually switching the separate pixels include active elements (i.e. transistors). Such an arrangement is referred to as an "active matrix", allowing a distinction between two types:

1. MOS (metal oxide semiconductor) or other diodes on a silicon wafer as the substrate.
2. Thin-film transistors (TFT) on a glass sheet as the substrate.

The use of monocrystalline silicon as a substrate material limits the display size, since even modular assembly of separate subdisplays gives rise to problems at the joints.

In the more promising type 2, which is preferred, the electro-optical effect used is usually the TN effect. A distinction is made between two technologies: TFTs composed of compound semiconductors such as CdSe, or TFTs on the basis of polycrystalline or amorphous silicon. Work on the latter technology is being carried out worldwide with great intensity.

The TFT matrix is applied on the inside of the one glass sheet of the display, while the other glass sheet on its inside carries the transparent counter-electrode. Compared with the size of the pixel electrode, the TFT is very small and hardly interferes with the image. This technology can also be extended to full color capability pictorial representations, where a mosaic of red, green and blue filters is arranged in such a way that filter elements are located opposite switchable picture elements in a one-to-one arrangement.

The TFT displays usually function as TN cells comprising crossed polarizers in transmission and employ backlighting.

The term matrix LCDs in this context encompasses any matrix display comprising integrated nonlinear elements, i.e. in addition to the active matrix it also includes displays comprising passive elements such as varistors or diodes (MIM=metal-insulator-metal).

Matrix LCDs of this type are suitable, in particular, for TV applications (e.g. portable television) or for high information level displays for computer applications (laptop) and in motor vehicle or aircraft production. In addition to problems regarding angular dependence of contrast and switching times, matrix LCDs present difficulties owing to insufficiently high resistivity of the liquid crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 et seq., Paris; STROMER, M., Proc. Eurodisplay 84, September 1984: Design of Thin Film Transistors for Matrix Addressing of Television Liquid Crystal Displays, p. 145 et seq., Paris]. As the resistance decreases, the contrast of a matrix LCD display deteriorates, and the problem of "afterimage elimination" can arise. As the resistivity of the liquid crystal mixture generally decreases over the lifetime of a matrix LCD, owing to interaction with the interior surfaces of the display, a high (initial) resistance is very important to achieve acceptable service lives. Particularly with low-voltage mixtures it has hitherto been impossible to achieve very high resistivities. Moreover, it is important for the resistivity to exhibit as low an increase as possible with increasing temperature and after thermal exposure and/or exposure to UV. A further particularly disadvantageous feature are the low-temperature properties of the prior art mixtures. The requirement is for no crystallization and/or smectic phases to occur even at low temperatures and for the viscosity temperature dependence to be as small as possible. The prior art matrix LCDs therefore do not meet present-day requirements.

There is therefore still a great need for matrix LCDs having very high resistivity and at the same time a wide operating temperature range, short switching times even at low temperatures, and a low threshold voltage, which do not exhibit these drawbacks or exhibit them only to a lesser extent.

For TN (Schadt-Helfrich) cells, media are desirable which permit the following advantages in these cells:

extended nematic phase domain (especially towards low temperatures)

switchability at extremely low temperatures (outdoor use, motor vehicles, avionics)

increased resistance to UV radiation (extended lifetime)

The media available from the prior art do not permit these advantages to be achieved while at the same time maintaining the other parameters.

For supertwisted cells (STN), media are desirable which permit higher multiplexability and/or lower threshold voltages and/or wider nematic phase domains (especially at low temperatures). For this purpose, a further expansion of the available parameter space (clearing point, transition smectic-nematic or melting point, viscosity, dielectric parameters, elastic parameters) is urgently required.

It is an object of the invention to provide media especially for such matrix LCDs, TN or STN displays which do not exhibit the abovementioned drawbacks or exhibit them only to a lesser extent, and preferably at the same time have very high resistivities and low threshold voltages.

We have found that this object can be achieved if displays employ media according to the invention.

SUMMARY OF THE INVENTION

The invention therefore relates to a liquid-crystalline medium on the basis of a mixture of polar compounds having positive dielectric anisotropy, characterized in that it comprises one or more compounds of the general formula IA

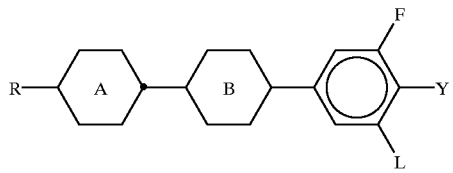

IA and one or more compounds of the formula IB

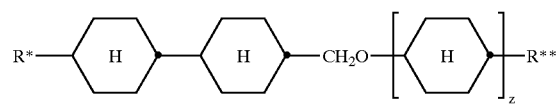

IB where

R, R* and R** each, independently of one another, are an alkyl or alkenyl radical having from 1 to 12 C atoms which is unsubstituted, singly substituted by CN or $CF_3$ or at least singly substituted by halogen, up to perhalogenated and, with the additional option of one or more $CH_2$ groups in these radicals, independently of one another in each case, being replaced by —O—, —S—,

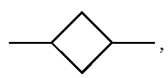

—CO—, —CO—O—, —O—CO— or —O—CO— O— in such a way that O atoms are not directly linked together,

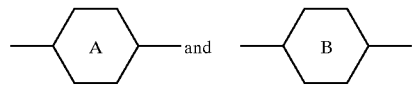

each, independently of one another, are

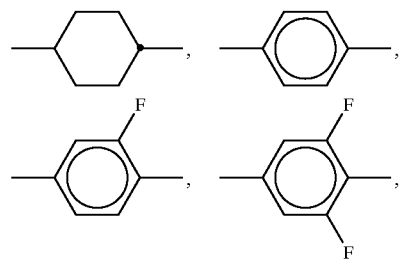

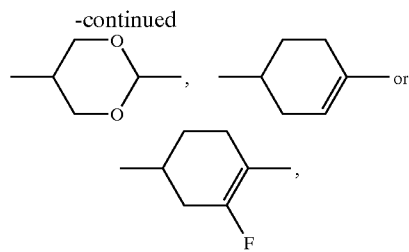

z is 1 or 2,

L is H or F, and

Y is F, Cl, CN, halogentated alkyl, halogenated alkenyloxy, halogenated alkoxy or halogenated alkenyl having up to 9 C atoms.

Especially with low-$\Delta n$ mixtures there is often the problem that compounds having a very high clearing point and low $\Delta n$ almost always have smectic phases and therefore in the mixture lead to LTS problems (Low Temperature Stability). By using the compounds of formula IB it is possible to prepare polar mixtures which have good reliability, good LTS and a relatively low $\Delta n$. Furthermore, the mixtures according to the invention are distinguished by their good holding ratio.

The compounds of the formulae IA and IB have a wide range of application. Depending on the selection of substituents, these compounds can serve as base materials of which liquid-crystalline media are predominantly composed; it is also possible, however, to admix compounds of formulae IA and IB to liquid-crystalline base materials from other classes of compounds, for example to influence the dielectric and/or optical anisotropy of such a dielectric and/or to optimize the threshold voltage and/or rotation viscosity $\gamma_1$, of the latter without a loss in $\Delta n$.

The compounds of the formulae IA and IB are colorless in the pure state and form liquid-crystalline mesophases in a temperature range located advantageously for electro-optical application. They are stable chemically, thermally and with respect to exposure to light.

The compounds of the formulae IA and IB are encompassed by U.S. Pat. No. 4,361,494 and WO 91/03450. The invention also relates to compounds of the formula IB.

Where R, R* or R** is an alkyl radical and/or an alkoxy radical, said radical can be straight-chain or branched. It is preferably straight-chain, has 2, 3, 4, 5, 6 or 7 C atoms and therefore preferably is ethyl, propyl, butyl, pentyl, hexyl, heptyl, ethoxy, propoxy, butoxy, pentoxy, hexoxy or heptoxy, also methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

Where R, R* or R** is an alkyl radical, in which a $CH_2$ group is replaced by —CH=CH—, said radical can be straight-chain or branched. Preferably it is straight-chain and has from 2 to 10 C atoms. Accordingly, in particular, it is vinyl, prop-1- or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl. Preferred among these are vinyl, 1E-alkenyl and 3E-alkenyl radicals.

Where R, R* or R** is an alkyl radical in which one CH$_2$ group has been replaced by —O— and one by —CO—, these are preferably adjacent. The radicals therefore contain an acyloxy group —CO—O— or an oxycarbonyl group —O—CO—. They are preferably straight-chain and have from 2 to 6 C atoms. In particular, they are therefore acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl, 4-(methoxycarbonyl)-butyl.

Where R, R* or R** is an alkyl radical in which a CH$_2$ group has been replaced by unsubstituted or substituted —CH=CH— and an adjacent CH$_2$ group has been replaced by CO or CO—O or O—CO, said radical can be straight-chain or branched. It is preferably straight-chain and has from 4 to 12 C atoms. In particular, it therefore is acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl, 9-methacryloyloxynonyl.

Where R, R* or R** is an alkyl or alkenyl radical monosubstituted by CN or CF$_3$, said radical is preferably straight-chain. The substitution by CN or CF$_3$ can be in any position.

Where R, R* or R** is an alkyl or alkenyl radical at least monosubstituted by halogen, up to perhalogenated, said radical is preferably straight-chain and halogen is preferably F or Cl. In the case of multisubstitution, halogen is preferably F. The resulting radicals also include perfluorinated radicals. In the case of monosubstitution, the fluoro or chloro substituent can be in any position, but is preferably in the ω position.

Compounds of the formulae IA and IB which carry pendant groups R, R*, R** suitable for polymerization reactions are suitable for the preparation of liquid-crystalline polymers.

Compounds of the formulae IA and IB with branched pendant groups R, R*, R** may, on some occasions, be of significance owing to better solubility in standard liquid-crystalline base materials, but particularly as chiral dopants if they are optically active. Smectic compounds of this type are suitable as components for ferroelectric materials.

Compounds of the formulae IA and/or IB with S$_A$ phases are suitable, for example, for thermally addressed displays.

Branched groups of this type as a rule contain not more than one chain branching. Preferred branched radicals R, R*, R** are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy, 1-methylheptoxy.

Where R, R* or R** is an alkyl radical in which two or more CH$_2$ groups are replaced by —O— and/or —CO—O—, said radical can be straight-chain or branched. It is preferably branched and has from 3 to 12 C atoms. In particular, it is therefore biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl) pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl) butyl, or 5,5-bis(ethoxycarbonyl)pentyl.

In compound IA, Y is preferably F, Cl, CN, CF$_3$, CF$_2$H, OCF$_3$, OCF$_2$H, OCFHCFH$_2$, OCFHCF$_2$H, OCF$_2$CH$_3$, OCF$_2$CFH$_2$, OCF$_2$CF$_2$H, OCF$_2$CF$_2$CF$_2$H, OCF$_2$CF$_2$CFH$_2$, OCFHCF$_2$CF$_3$, OCFHCF$_2$CF$_2$H, OCFHCFHCF$_3$, OCH$_2$CF$_2$CF$_3$, OCF$_2$CF$_2$CF$_3$, OCF$_2$CFHCFH$_2$, OCF$_2$CH$_2$CF$_2$H, OCFHCF$_2$CFH$_2$, OCFHCFHCF$_2$H, OCFHCH$_2$CF$_3$, OCH$_2$CFHCF$_3$, OCH$_2$CF$_2$CF$_2$H, OCF$_2$CFHCH$_3$, OCF$_2$CH$_2$CFH$_2$, OCFHCF$_2$CH$_3$, OCFHCFHCFH$_2$, OCFHCH$_2$CF$_3$, OCH$_2$CF$_2$CFH$_2$, OCH$_2$CFHCF$_2$H, OCF$_2$CH$_2$CH$_3$, OCFHCFHCH$_3$, OCFHCH$_2$CFH$_2$, OCH$_2$CF$_2$CH$_3$, OCH$_2$CFHCFH$_2$, OCH$_2$CH$_2$CF$_2$H, OCHCH$_2$CH$_3$, OCH$_2$CFHCH$_3$, OCH$_2$CH$_2$CF$_2$H, OCClFCF$_3$, OCClFCClF$_2$, OCClFCFH$_2$, OCFHCCl$_2$F, OCClFCF$_2$H, OCClFCClF$_2$, OCF$_2$CClH$_2$, OCF$_2$CCl$_2$H, OCF$_2$CCl$_2$F, OCF$_2$CClFH, OCF$_2$CClF$_2$, OCF$_2$CF$_2$CClF$_2$, OCF$_2$CF$_2$CCl$_2$F, OCClFCF$_2$CF$_3$, OCClFCF$_2$CF$_2$H, OCClFCF$_2$CClF$_2$, OCClFCFHCF$_3$, OCClFCClFCF$_3$, OCCl$_2$CF$_2$CF$_3$, OCClHCF$_2$CF$_3$, OCClFCF$_2$CF$_3$, OCClFCClFCF$_3$, OCF$_2$CClFCFH$_2$, OCF$_2$CF$_2$CCl$_2$F, OCF$_2$CCl$_2$, CF$_2$H, OCF$_2$CH$_2$CClF$_2$, OCClFCF$_2$CFH$_2$, OCFHCF$_2$CCl$_2$F, OCClFCFHCF$_2$H, OCClFCClFCF$_2$H, OCFHCFHCClF$_2$, OCClFCH$_2$CF$_3$, OCFHCCl$_2$CF$_3$, OCCl$_2$CFHCF$_3$, OCH$_2$CClFCF$_3$, OCCl$_2$CF$_2$CF$_2$H, OCH$_2$CF$_2$CClF$_2$, OCF$_2$CClFCH$_3$, OCF$_2$CFHCCl$_2$H, OCF$_2$CCl$_2$CFH$_2$, OCF$_2$CH$_2$CCl$_2$F, OCClFCF$_2$CH$_3$, OCFHCF$_2$CCl$_2$H, OCClFCClFCFH$_2$, OCFHCFHCCl$_2$F, OCClFCH$_2$CF$_3$, OCFHCCl$_2$CF$_3$, OCCl$_2$CF$_2$CFH$_2$, OCH$_2$CF$_2$CCl$_2$F, OCCl$_2$CFHCF$_2$H, OCClHCClFCF$_2$H, OCF$_2$CClHCClH$_2$, OCF$_2$CH$_2$CCl$_2$H, OCClFCFHCH$_3$, OCF$_2$CClFCCl$_2$H, OCClFCH$_2$CFH$_2$, OCFHCCl$_2$CFH$_2$, OCCl$_2$CF$_2$CH$_3$, OCH$_2$CF$_2$CClH$_2$, OCCl$_2$CFHCFH$_2$, OCH$_2$CClFCFCl$_2$, OCH$_2$CH$_2$CF$_2$H, OCClHCClHCFH$_2$, OCH$_2$CCl$_2$CF$_2$H, OCClFCH$_2$CH$_3$, OCFHCH$_2$CCl$_2$H, OCClHCFHCClH$_2$, OCH$_2$CFHCCl$_2$H, OCCl$_2$CH$_2$CF$_2$H, OCH$_2$CCl$_2$CF$_2$H, OCH=CHF, OCH=CF$_2$, OCF=CHF, OCF=CF$_2$, in particular F, Cl, CN, CF$_3$, CF$_2$H, OCF$_3$, OCF$_2$H, OCFHCF$_3$, OCFHCFH$_2$, OCFHCF$_2$H, OCF$_2$CH$_3$, OCF$_2$CFH$_2$, OCF$_2$CF$_2$H, OCF$_2$CF$_2$CF$_2$H, OCF$_2$CF$_2$CFH$_2$, OCFHCF$_2$CF$_3$, OCFHCF$_2$CF$_2$H, OCF$_2$CF$_2$CF$_3$, OCF$_2$CHFCF$_3$, OCClFCF$_2$CF$_3$ or OCH=CF$_2$.

The compounds of the formulae IA and IB are prepared in accordance with methods known per se, as described in the literature (e.g. in the standard textbooks such as Houben-Weyl, Methoden der Organischen Chemie, Georg-Thieme-Verlag, Stuttgart) specifically under reaction conditions known and suitable for these reactions. This also includes the use of variants known per se but not mentioned here in detail.

The compounds of the formula IB can, for example, be prepared as follows:

Scheme 1

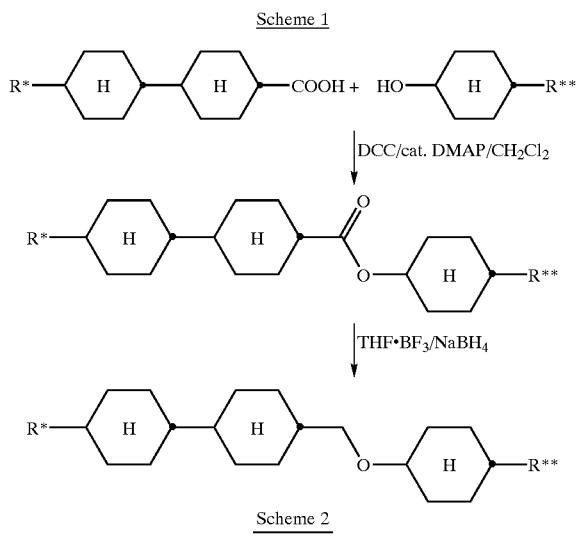

Scheme 2

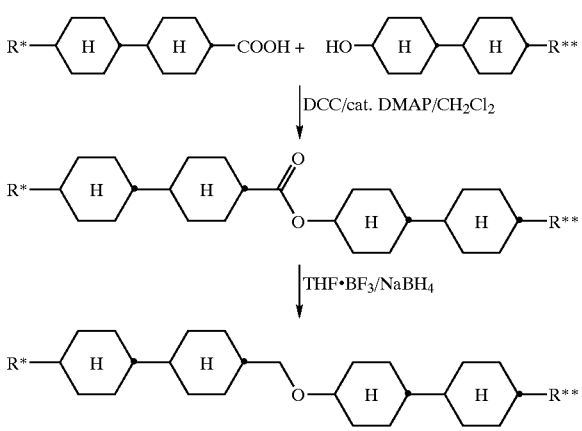

The invention also relates to electro-optical displays (in particular STN displays or matrix LCDs with two plane-parallel substrates which, together with a border, form a cell, integrated nonlinear elements for switching individual pixels on the substrates and, present in the cell, a nematic liquid crystal mixture having positive dielectric anisotropy and high resistivity) which comprise such media and to the use of these media for electro-optical purposes.

The liquid crystal mixtures according to the invention permit a considerable expansion of the available parameter space.

The achievable combinations of clearing point, viscosity at low temperature, thermal and UV stability and dielectric anisotropy are far superior to current prior art materials.

The liquid crystal mixtures according to the invention, while maintaining the nematic phase down to −20° C. and preferably down to −30° C., particularly preferably down to −40° C., make it possible to achieve clearing points above 80° C., preferably above 90° C., particularly preferably above 100° C., simultaneously dielectric anisotropy values $\Delta\epsilon \geq 3$, preferably $\geq 4$ and a high specific resistivity, thereby allowing excellent STN displays and matrix LCDs to be achieved. In particular, the mixtures are characterized by low operating voltages. The TN thresholds are below 2.4 V, preferably below 2.2 V, particularly preferably <2.0 V.

It is self-evident that a suitable choice of the components of the mixtures according to the invention also allows higher clearing points (e.g. above 110° C.) in conjunction with a higher threshold voltage, or lower clearing points in conjunction with lower threshold voltages to be achieved while maintaining the other advantageous properties. Equally it is possible, in conjunction with a correspondingly small increase in viscosities, to obtain mixtures with a larger $\Delta\epsilon$ and consequently lower thresholds. The matrix LCDs according to the invention preferably operate in the first transmission minimum according to Gooch and Tarry [C. H. Gooch and H. A. Tarry, Electron. Lett. 10, 2–4, 1974; C. H. Gooch and H. A. Tarry, Appl. Phys. Vol. 8, 1575–1584, 1975], resulting not only in particularly favourable electro-optical properties such as e.g. steep slope of the characteristic curve and low angular dependence of contrast (German Patent 3022818), but also a smaller dielectric anisotropy being sufficient in the second minimum in conjunction with a threshold voltage equal to that of an analogue display.

Consequently it is possible, using the mixtures according to the invention, to achieve distinctly higher resistivities in the first minimum than with mixtures comprising cyano compounds. Those skilled in the art, using simple routine methods, are able, via a suitable choice of the individual components and their proportions by weight, to adjust the birefringence required for a predefined layer thickness of the matrix LCD.

The flow viscosity $v_{20}$ at 20° C. is preferably <60 mm²·s⁻¹, particularly preferably <50 mm²·s⁻¹. The nematic phase domain is preferably at least 90°, in particular at least 100°. Preferably, this domain extends at least from −20° to +80°.

Measurements of the "capacity holding ratio" (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formulae IA and IB exhibit a distinctly smaller decrease in HR with increasing temperature than analogous mixtures comprising, instead of the compounds of the formula IB, cyanophenylcyclohexanes of the formula

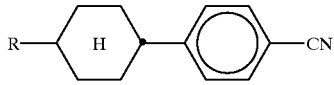

or esters of the formula

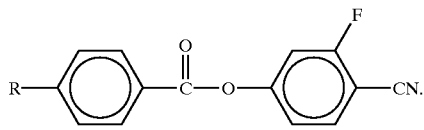

The UV stability of the mixtures according to the invention is likewise considerably better, i.e. they exhibit a distinctly smaller decrease in HR under exposure to UV.

Preferably, the media according to the invention are based on a plurality (preferably two, three, four or more) compounds of the formula IA and/or IB, i.e. the proportion of these compounds is 5–95%, preferably 10–60% and particularly preferably in the range of 20–50%.

Individual compounds of the formulae IA, IB, II to XVI and their subformulae which can be used in the media according to the invention are either known or they can be prepared in a manner similar to that of the known compounds.

Preferred embodiments are specified below:

compounds of the formula IA are preferentially selected from the group consisting of the compounds IA1–IA10:

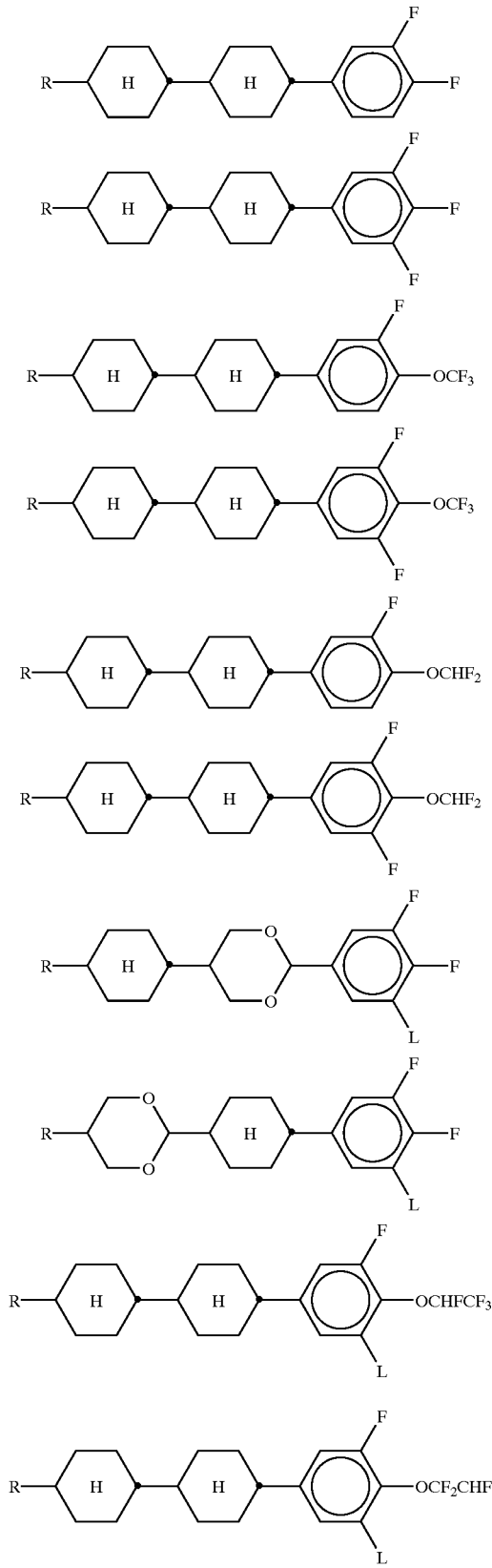

where R has the meaning specified in claim 1, but is preferably a straight-chain alkyl, vinyl, 1E-alkenyl or 3E-alkenyl, particularly methyl, ethyl, n-propyl, n-butyl, n-pentyl or n-hexyl.

In the compound of the formula IB, R* and R**, each independently of one another, are preferably straight-chain alkyl, alkoxy, alkenyl or alkenyloxy, particularly alkyl having from 1 to 5 C atoms.

Preferred liquid-crystalline mixtures comprise two or three compounds of the formula IB. Particularly preferred are mixtures which comprise two or three compounds of the formula IB1 to IB6:

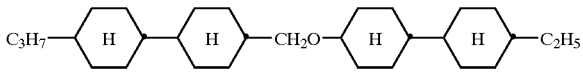

IB1

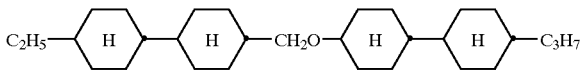

IB2

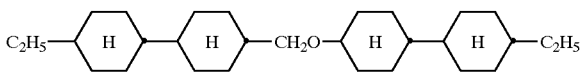

IB3

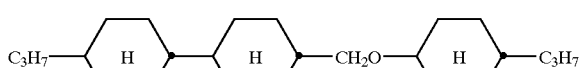

IB4

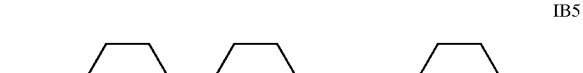

IB5

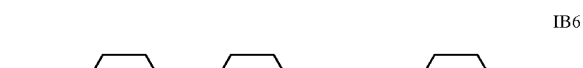

IB6

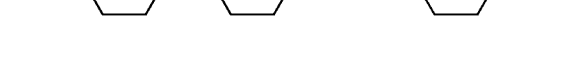

The medium additionally comprises one or more compounds selected from the group consisting of the general formulae II to VIII:

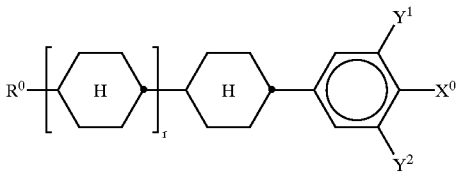

II

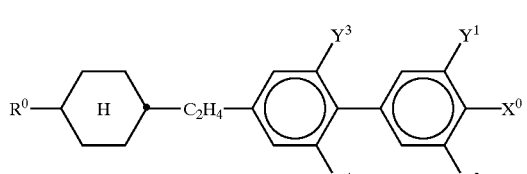

III

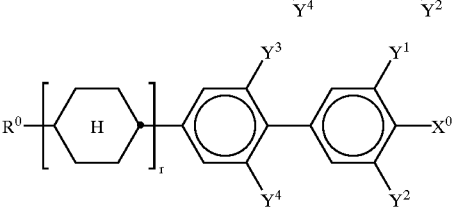

IV

-continued

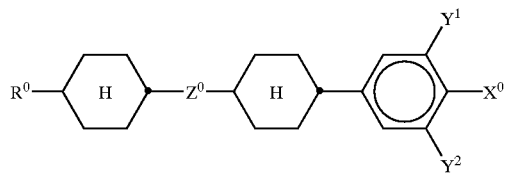
V

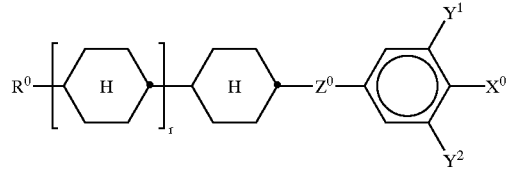
VI

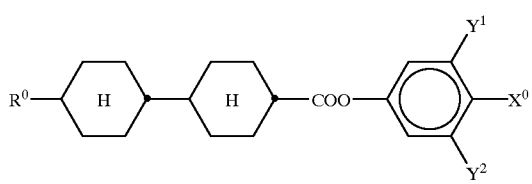
VII

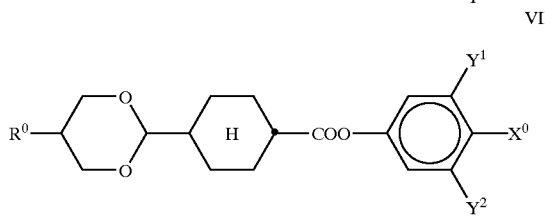
VIII where the individual radicals have the following meanings:

$R^0$: n-alkyl, oxaalkyl, fluoroalkyl, alkenyloxy or alkenyl each having up to 9 C atoms, $X^0$: F, Cl, halogenated alkyl, alkenyl or alkoxy having from 1 to 6 C atoms, $Z^0$: —$C_2H_4$—, —$CH_2O$—, —$OCH_2$—, —$CF_2O$—, —$OCF_2$—, —CF=CF— or —$C_2F_4$—, $Y^1$ to $Y^4$: each, independently of one another, H or F, r: 0 or 1, The compound of the formula IV is preferably

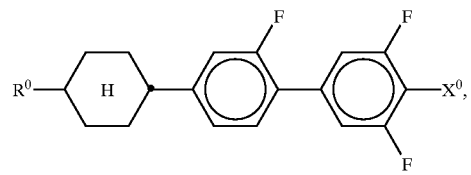
IVa

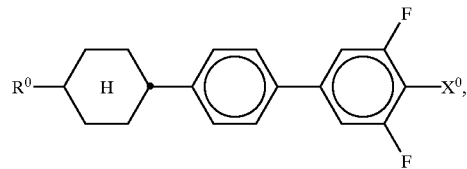
IVb

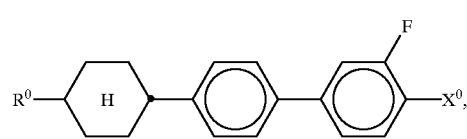
IVc

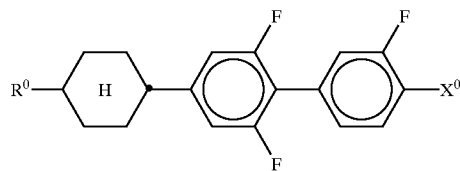
IVd

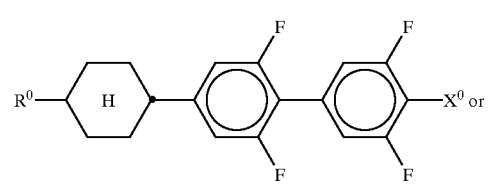
IVe

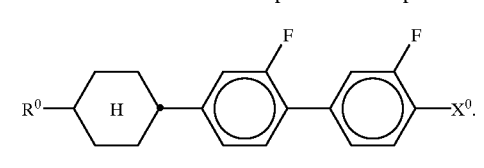
IVf

In this context, the compounds of the formulae II and IV are not identical with the compounds of the formula IA.

The medium additionally contains one or more compounds selected from the group consisting of the general formulae IX to XVI:

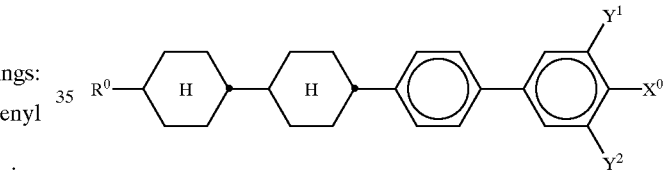
IX

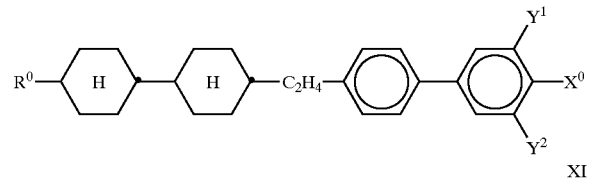
X

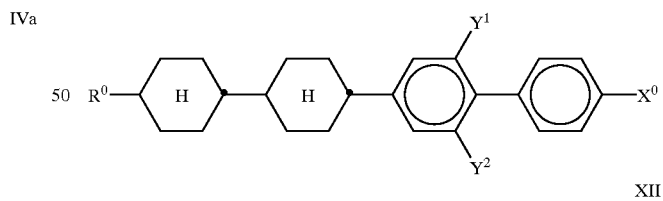
XI

XII

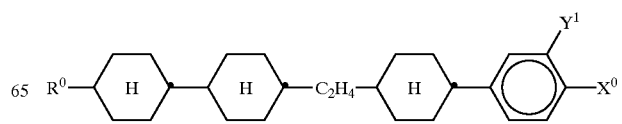
XIII

-continued

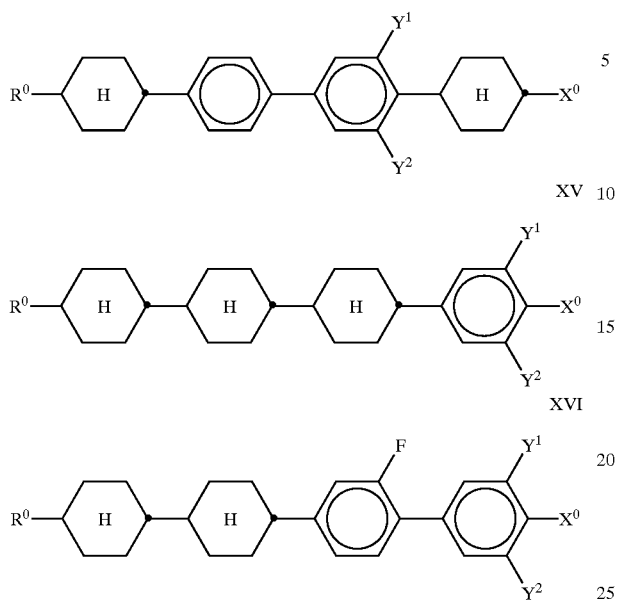

where $R^0$, $X^0$, $Y^1$ and $Y^2$ each, independently of one another, have one of the meanings specified in Claim 2. $X^0$ is preferably F, Cl, $CF_3$, $OCF_3$, $OCHF_2$, $OCHFCF_3$, $OC_2F_5$, also $OCH=CF_2$, $OCF=CF_2$, $OCH=CHF$, $OCH=CH—CF_3$, $OCF_2CHF_2$, $C_2F_5$, $C_3F_7$, $OCH_2CH_2CF_3$. $R^0$ is preferably alkyl, oxaalkyl, fluoroalkyl, alkenyloxy or alkenyl, each having up to 6 C atoms.

The medium additionally contains one or more compounds of the formulae RI, RII, RIII, RIV or RV

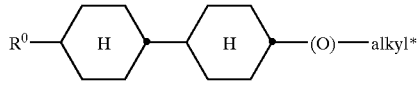

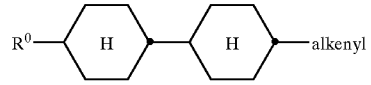

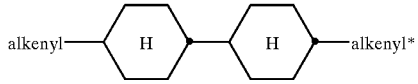

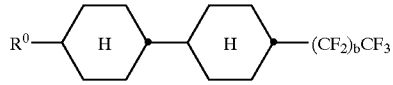

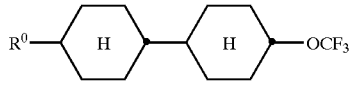

where $R^0$ has the above-specified meaning, preferably being straight-chain alkyl having 1–6 C atoms, and alkenyl and alkenyl are straight-chain or branched alkenyl radicals having 2–9 C atoms, each preferably, independently of one another, being vinyl, 1E-alkenyl, 3E-alkenyl or 4-alkenyl having up to 9 C atoms; alkyl and alkyl* are straight-chain alkyl, each preferably independently of one another, having from 1 to 9 C atoms; and b is 0, 1 or 2.

The proportion of compounds of the formulae IA, IB and II to VI jointly in the mixture as a whole is at least from 50 wt %;

The proportion of compounds of the formulae IA and IB in the mixture as a whole is from 10 to 100 wt %;

The proportion of compounds of the formula IB in the mixture as a whole is from 2 to 30 wt %, preferably 4 to 20 wt %;

The proportion of compounds of the formulae II to VIII in the mixture as a whole is from 10 to 50 wt %;

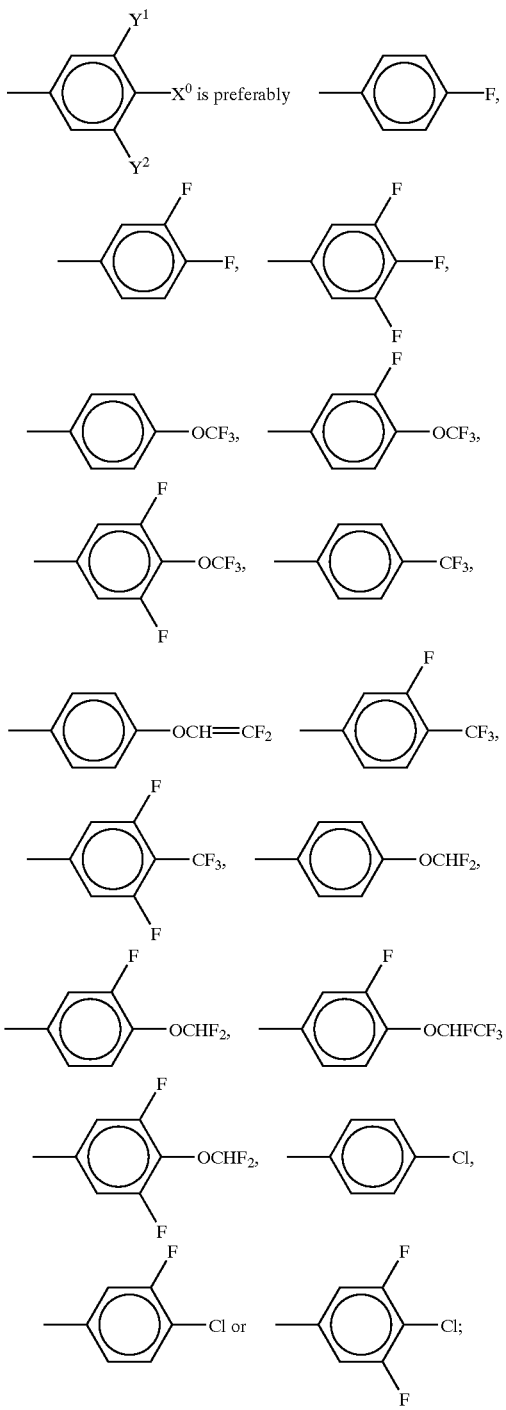

The medium, in addition to one or more compounds of the formulae IA and IB, preferably comprises one or more compounds, preferably two, three or four compounds of the formulae II, III, IV, V, VI, VII and/or VIII;

The medium according to the invention preferably comprises one or more compounds of the formulae

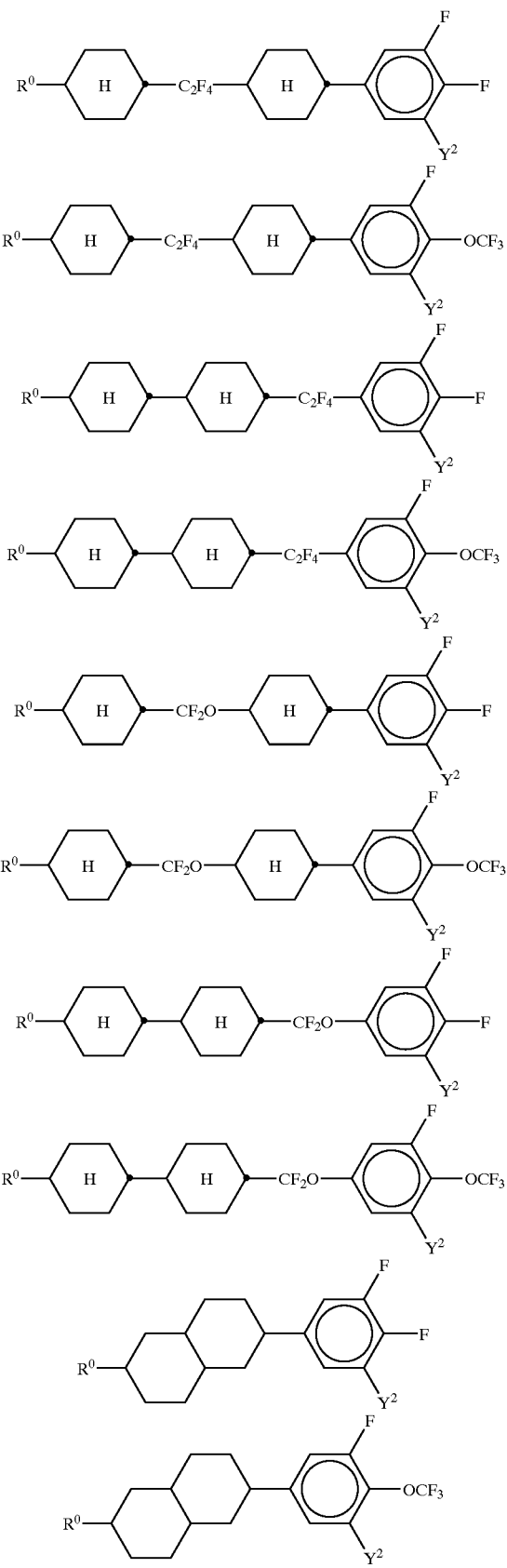

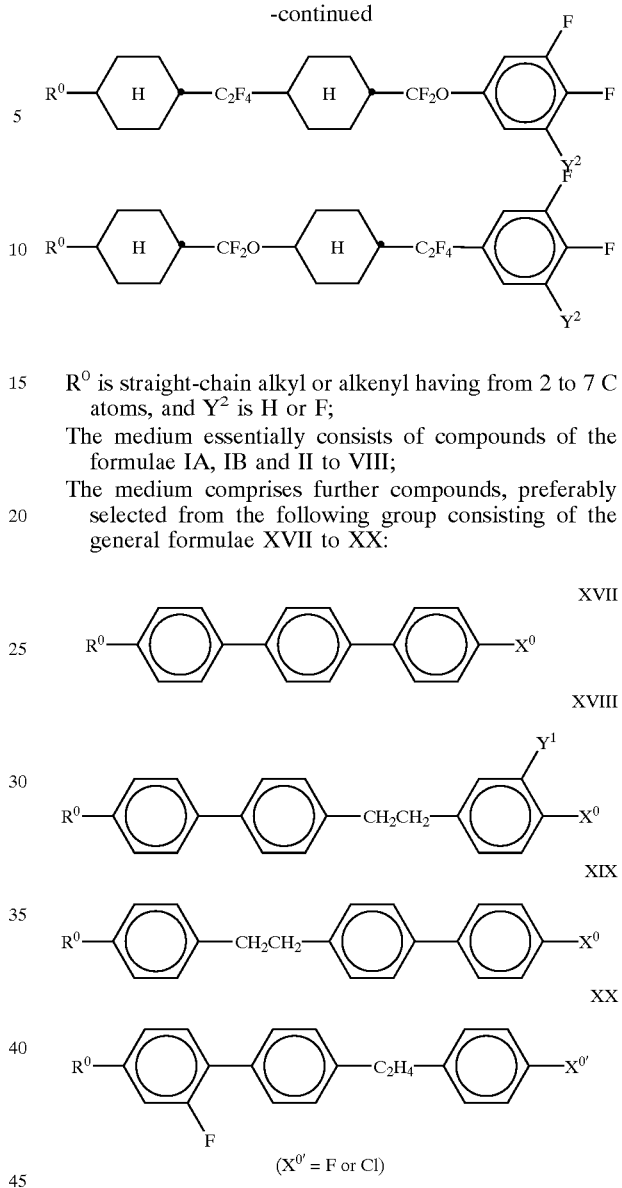

$R^0$ is straight-chain alkyl or alkenyl having from 2 to 7 C atoms, and $Y^2$ is H or F;

The medium essentially consists of compounds of the formulae IA, IB and II to VIII;

The medium comprises further compounds, preferably selected from the following group consisting of the general formulae XVII to XX:

where $R^0$, $Y^1$ and $X^0$ have the above-specified meanings and the 1,4-phenylene rings can be substituted by one or two CN, chlorine or fluorine atoms. Preferably, the 1,4-phenylene rings are monosubstituted or polysubstituted by fluorine atoms.

The weight ratio (IA+IB): (II+III+IV+V+VI+VII+VIII) is preferably from 1:10 to 10:1.

The medium essentially consists of compounds selected from the group consisting of the general formulae IA, IB, II to XVI, RI, RII, RIII, RIV and/or RV.

The proportion of compounds of the formulae RI, RII and/or RIII in the mixture as a whole is 5–60 wt %, preferably 10–40 wt %.

It was found that even a relatively small proportion of compounds of the formulae IA and IB mixed with conventional liquid crystal materials, but in particular with one or more compounds of the formulae II, III, IV, V, VI, VII and/or VIII, leads to a considerable decrease in the threshold voltage and to low values of the birefringence, wide-domain nematic phases with low smectic-nematic transition temperatures being observed at the same time, thereby improving the storage stability. Particularly preferred are mixtures which, in addition to one or more compounds of the formulae IA and IB, comprise one or more compounds of the formula IV, particularly compounds of the formula IVa, where $X^0$ is F or $OCF_3$. The compounds of the formulae IA, IB, II to VIII are colorless, stable and readily miscible with one another and with other liquid crystal materials.

The term "alkyl" or "alkyl*" encompasses straight-chain and branched alkyl groups having 1–6 carbon atoms, particularly the straight-chain groups methyl, ethyl, propyl, butyl, pentyl and hexyl. Groups having 2–5 carbon atoms are generally preferred.

The term "alkenyl" or "alkenyl*" encompasses straight-chain and branched alkenyl groups having 2–9 carbon atoms, particularly the straight-chain groups. Alkenyl groups in particular are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, especially $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups with terminal fluorine, i.e. fluoromethyl, 2-fluoroethyl, 3-fluoropropyl, 4-fluorobutyl, 5-fluoropentyl, 6-fluorohexyl and 7-fluoroheptyl. Other positions of fluorine are not precluded, however.

The term "oxaalkyl" preferably encompasses straight-chain radicals of the formula $C_nH_{2n+1}$—O—$(CH_2)_m$, where n and m each, independently of one another, range from 1 to 6. Preferably, n=1 and m is 1 to 6. A suitable choice of the meanings of $R^0$ and $X^0$ allows the response times, the threshold voltage, the slope of the transmission characteristics etc. to be modified as desired. For example, 1E-alkenyl radicals, 3E-alkenyl radicals, 2E-alkenyloxy radicals and the like as a rule lead to shorter response times, improved nematic tendencies and a higher ratio of the elastic constants $k_{33}$ (bend) and $k_{11}$ (splay), compared with alkyl or alkoxy radicals. 4-alkenyl radicals, 3-alkenyl radicals and the like generally result in lower threshold voltages and smaller values of $k_{33}/k_{11}$ than alkyl and alkoxy radicals.

A —$CH_2CH_2$ group leads generally to higher values for $k_{33}/k_{11}$, compared with a single covalent bond. Higher values of $k_{33}/k_{11}$ permit, for example, less steep transmission characteristics in TN cells with twists of 90° (to achieve grey hues) and steeper transmission characteristics in STN, SBE and OMI cells (higher multiplexability) and vice versa.

The optimal quantitative ratio of the compounds of the formulae (IA+IB) and II+III+IV+V+VI+VII+VIII largely depends on the desired characteristics, on the choice of components of the formulae IA, IB, II, III, IV, V, VI, VII and/or VIII, and on the choice of any further components present. Suitable quantitative ratios within the above-specified range can readily be determined ad hoc.

The total quantity of compounds of the formulae IA, IB, II to XVI in the mixtures according to the invention is not critical. The mixtures can therefore comprise one or more further components, to optimize various properties. The observed effect on the response times and on the threshold voltage, however, as a rule is higher, the higher the overall concentration of compounds of the formulae IA, IB, II to XVI.

In a particularly preferred embodiment, the media according to the invention comprise compounds of the formulae II to VIII (preferably II, III and/or IV, especially IVa), where $X^0$ is F, $OCF_3$, $OCHF_2$, $OCH=CF_2$, $OCF=CF_2$ or $OCF_2$—$CF_2H$. A beneficial synergistic effect with the compounds of formulae IA and IB results in particularly advantageous properties.

The construction of the matrix LCD according to the invention comprising polarizers, electrode baseplates and electrodes with a surface treatment corresponds to the standard design of such displays. Within the present context, the term "standard design" is comprehensive and additionally encompasses any variations and modifications of the matrix LCD, including in particular matrix display elements on the basis of poly-Si TFT or MIM.

An essential difference between the displays according to the invention and the current customary displays based on the twisted nematic cell is constituted, however, by the choice of liquid crystal parameters of the liquid crystal layer.

The preparation of the liquid crystal mixtures which can be used according to the invention is carried out by methods which are customary per se. As a rule, the desired quantity of the components used in smaller amounts is dissolved in the component which constitutes the main ingredient, preferably at elevated temperature. An alternative procedure is to mix solutions of the components in an organic solvent, e.g. in acetone, chloroform or methanol, and then, after thorough mixing, to remove the solvent again, for example by distillation.

The dielectrics can also comprise further additives known to those skilled in the art and described in the literature. For example, 0–15% of pleochroitic dyes or chiral dopants can be added.

C refers to a crystalline phase, S to a smectic phase, $S_c$ to a smectic C, N to a nematic phase and I to the isotropic phase.

$V_{10}$ denotes the voltage for 10% transmission (viewing direction perpendicular to the substrate surface). $t_{on}$ denotes the on and $t_{off}$ the off time at an operating voltage corresponding to 2.5 times the value of $V_{10}$. $\Delta n$ denotes the optical anisotropy and $n_0$ the refractive index. $\Delta \in$ denotes the dielectric anisotropy ($\Delta \in = \in_{\parallel} - \in_{\perp}$, where $\in_{\parallel}$ refers to the dielectric constant parallel to the longitudinal axes of the molecule and $\in_{\perp}$ is the dielectric constant perpendicular thereto). The electro-optical data were measured in a TN cell in the 1st minimum (i.e. at a d·$\Delta n$ value of 0.5) at 20° C., unless explicitly stated otherwise. The optical data were measured at 20° C., unless explicitly stated otherwise.

In the present application and in the following examples, the structures of the liquid crystal compounds are specified by acronyms, which can be transformed into chemical formulae according to the following Tables A and B. All the radicals $C_nH_{2n+1}$ and $C_mH_{2m+1}$ are straight-chain alkyl radicals having n or m C atoms; n and m, independently of one another, denote integers, preferably 0, 1, 2, 3, 4, 5, 6, 7, 8, 9, 10, 11 or 12. The coding according to Table B is self-evident. Table A specifies the acronym for the parent body only.

In individual cases, the acronym for the parent body is followed, separated therefrom by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |

| Code for $R^1$, $R^2$, $L^1$, $L^2$ | $R^1$ | $R^2$ | $L^1$ | $L^2$ |
|---|---|---|---|---|
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | $CF_3$ | H | H |
| nOCF$_3$ | $C_nH_{2n+1}$ | $OCF_3$ | H | H |
| nOCF$_2$ | $C_nH_{2n+1}$ | $OCHF_2$ | H | H |
| nS | $C_nH_{2n+1}$ | NCS | H | H |
| rVsN | $C_rH_{2r+1}-CH=CH-C_sH_{2s}-$ | CN | H | H |
| rVsF | $C_rH_{2r+1}-CH=CH-C_sH_{2s}-$ | F | H | H |
| rEsN | $C_rH_{sr+1}-O-C_sH_{2s}-$ | CN | H | H |
| nAm | $C_nH_{2n+1}$ | $COOC_mH_{2m+1}$ | H | H |

Preferred mixture components are listed in Tables A and B.

TABLE A

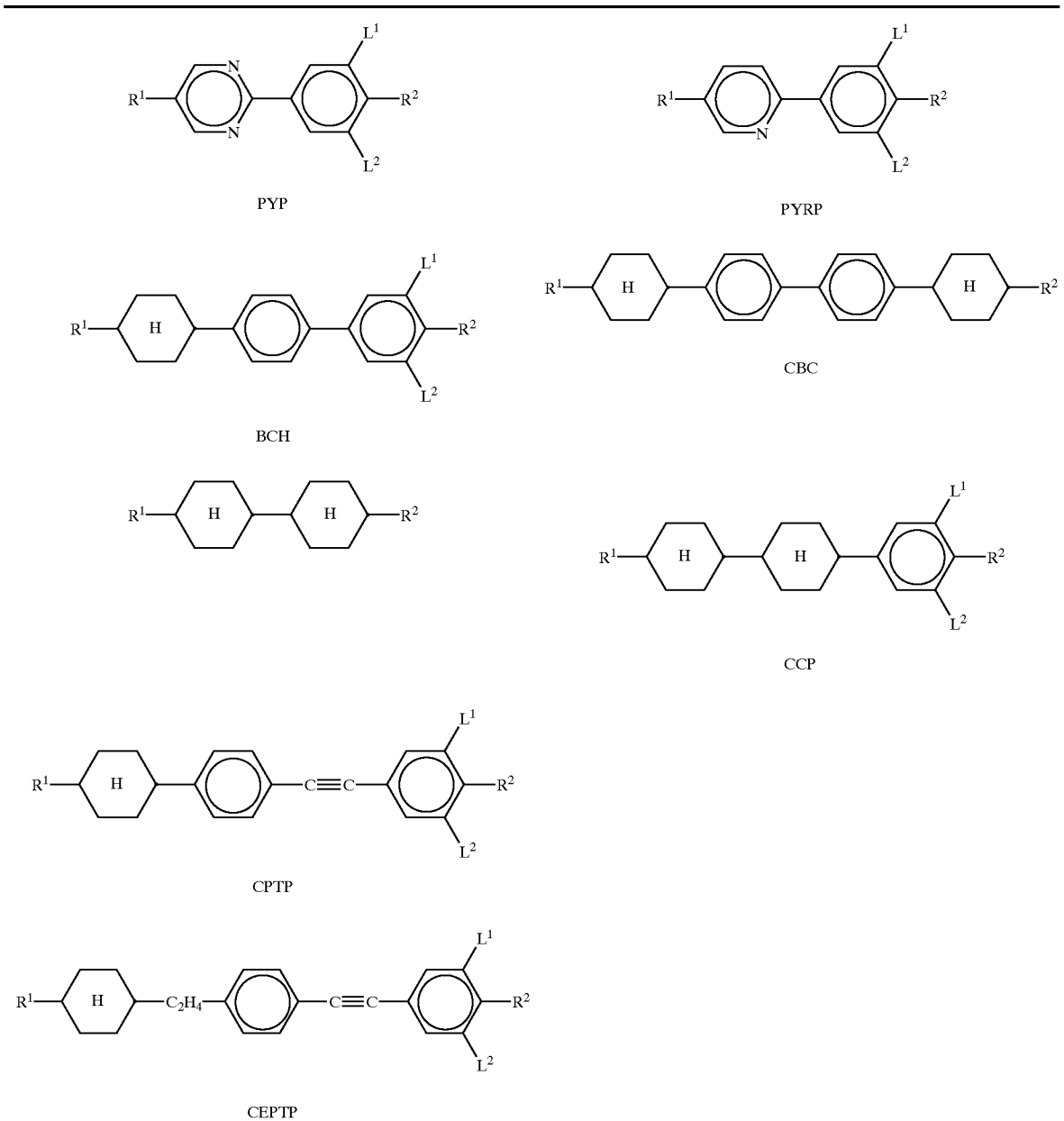

PYP

PYRP

BCH

CBC

CCP

CPTP

CEPTP

TABLE A-continued
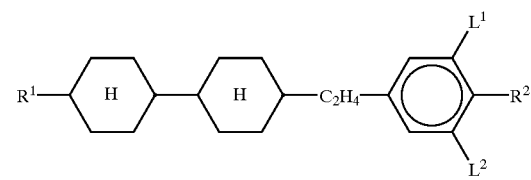
ECCP
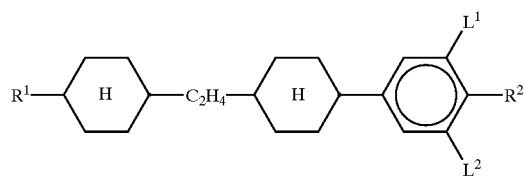
CECP
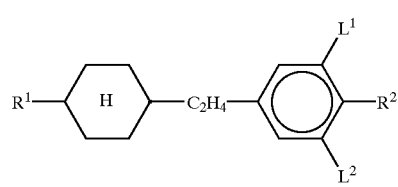
EPCH
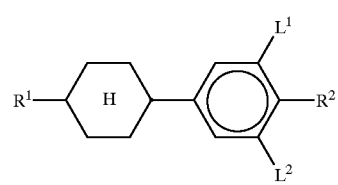
PCH
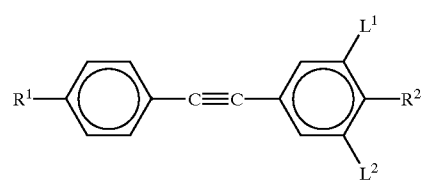
PTP
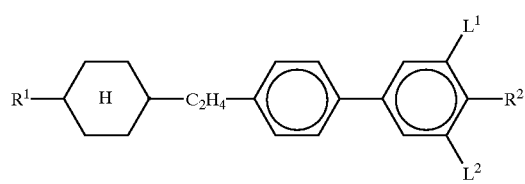
BECH
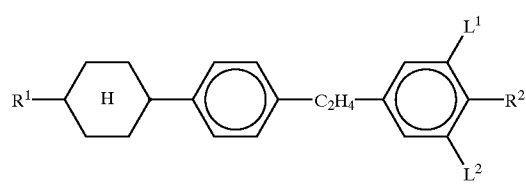
EBCH
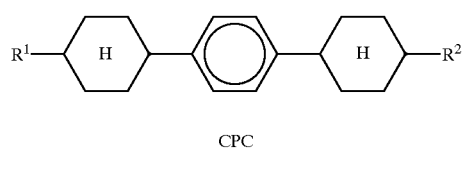
CPC
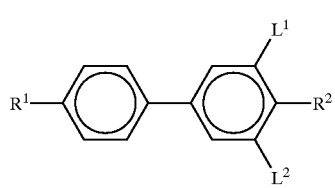
B
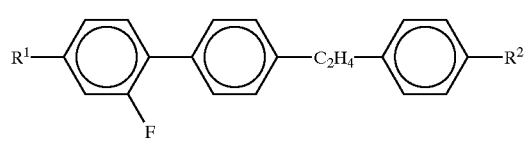
FET-nF
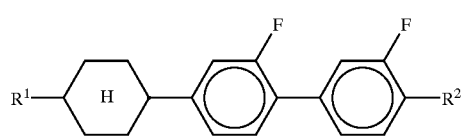
CGG
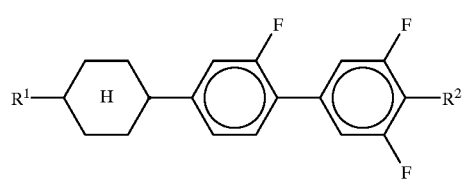
CGU
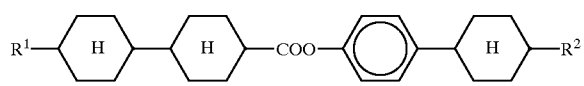
CCPC TABLE A-continued
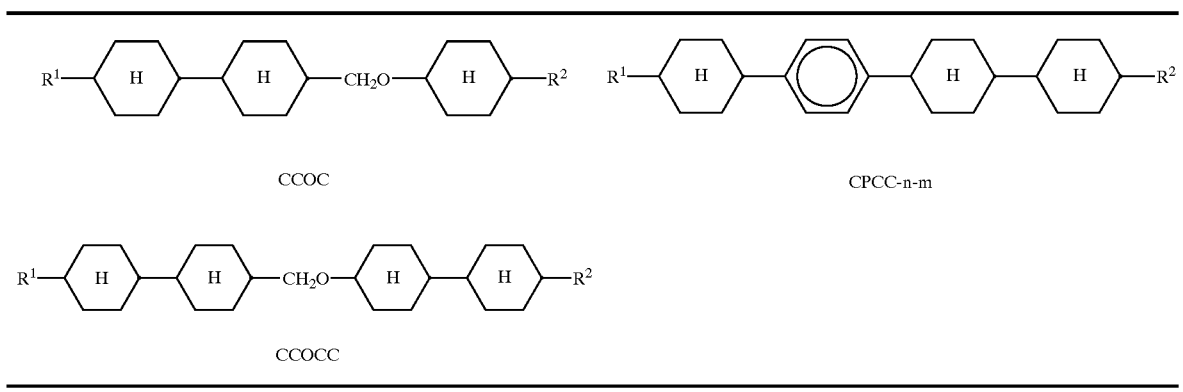
TABLE B
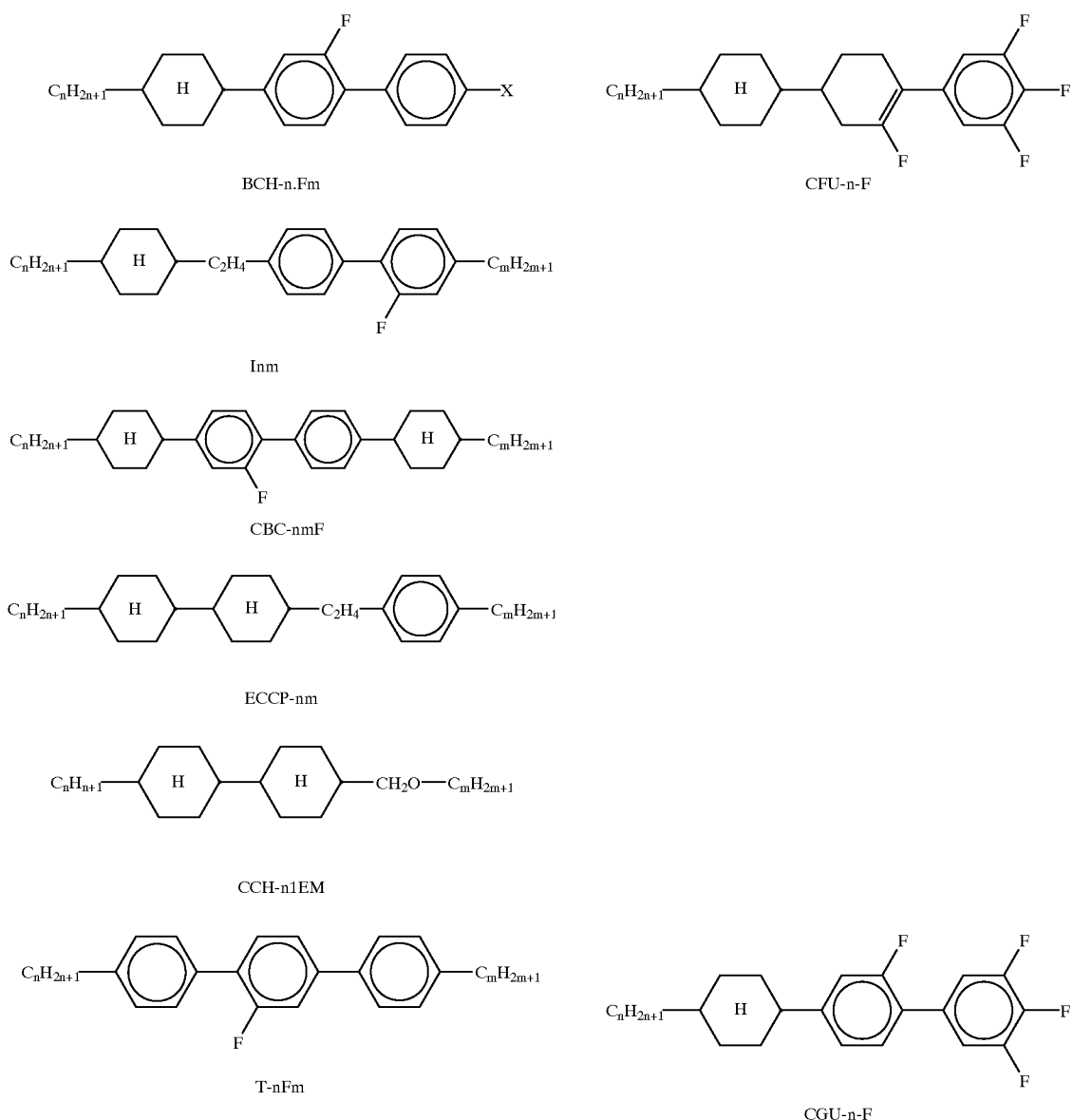

TABLE B-continued
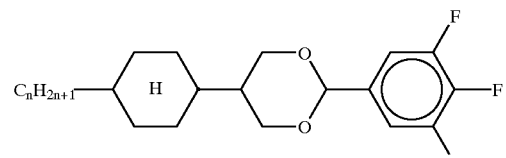
CDU-n-F
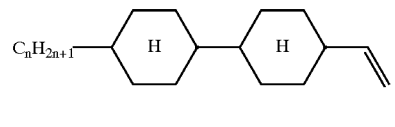
CC-n-V
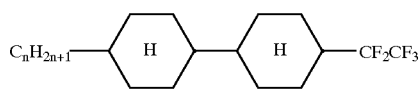
CC-n-DT
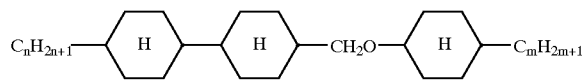
CCOC-n-m
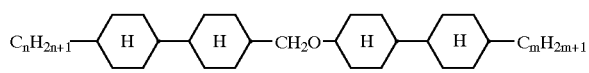
CCOCC-n-m
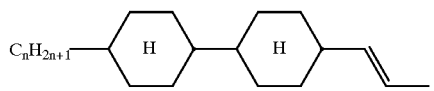
CC-n-V1
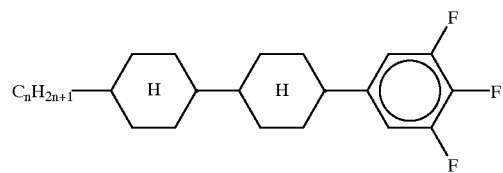
CCP-nF.F.F
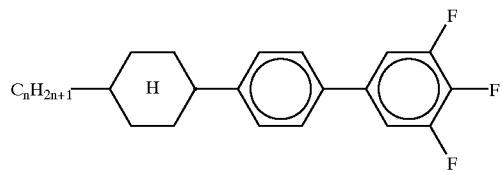
BCH-nF.F.F
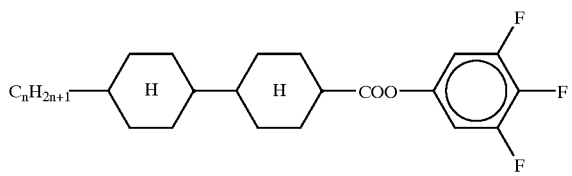
CCZU-n-F
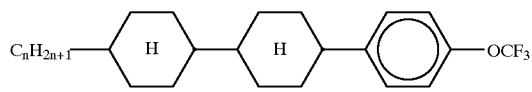
CCP-nOCF$_3$
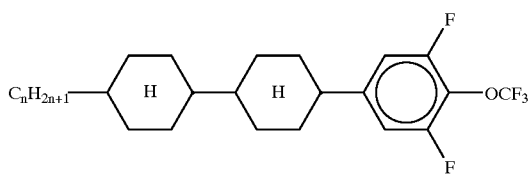
CCP-nOCF$_3$.F.F
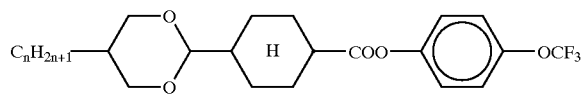
DCZG-n-OT TABLE B-continued
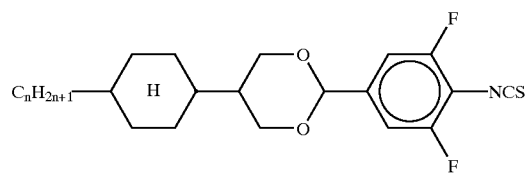
CDU-n-S
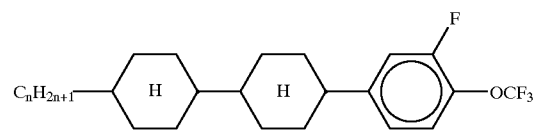
CCP-n-OCF₃.F
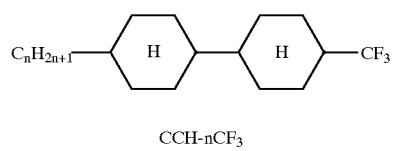
CCH-nCF₃
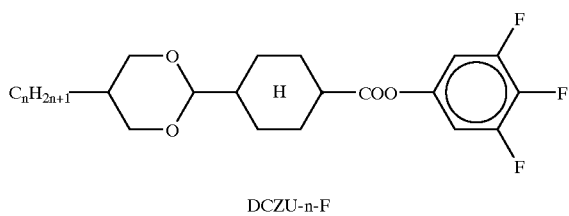
DCZU-n-F
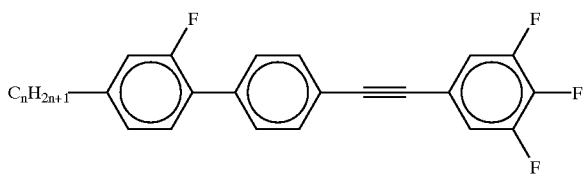
GPTU-n-F
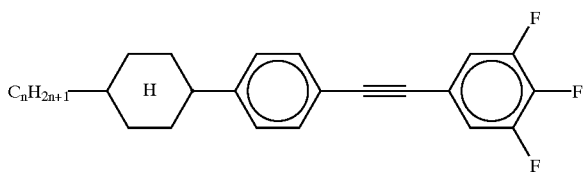
CPTU-n-F
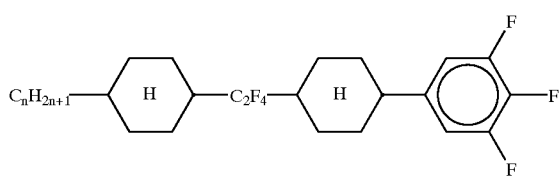
CWCU-n-F
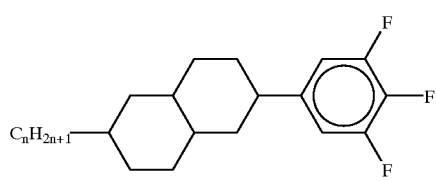
Dec-U-n-F
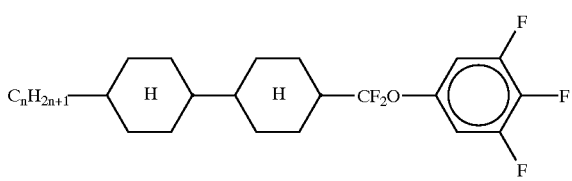
CCQU-n-F
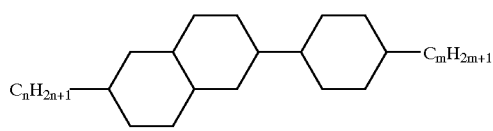
CHD-n-m Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German Application Nos. 199 27 99.3, filed Jun. 18, 1999 and No. 199 61 305.2, filed Dec. 18, 1999, is hereby incorporated by reference.

Furthermore, m.p. means melting point, c.p.=clearing point. Other symbols: C=crystalline state, N=nematic phase, S=smectic phase, and I=isotropic phase. The data between these symbols represent the transition temperatures. $\Delta n$ means optical anisotropy (589 nm, 20° C.). The flow viscosity $v_{20}$ (mm²/sec) and the rotational viscosity $\gamma_1$ [mPa·s] were each determined at 20° C.

"Standard work-up" means: water is added if required, the mixture is extracted with dichloromethane, diethyl ether, methyl tert-butyl ether or toluene, followed by phase separation, drying of the organic phase, evaporation of solvent and purification of the product by distillation under reduced pressure or crystallization and/or chromatography. The following abbreviations are used:

| | |
|---|---|
| n-BuLi | 1.6 molar solution of n-butyllithium in n-hexane |
| DMAP | 4-(dimethylamino)-pyridine |
| THF | tetrahydrofuran |
| DCC | N,N'-dicyclohexylcarbodiimide |

EXAMPLES

Example 1

Step 1.1

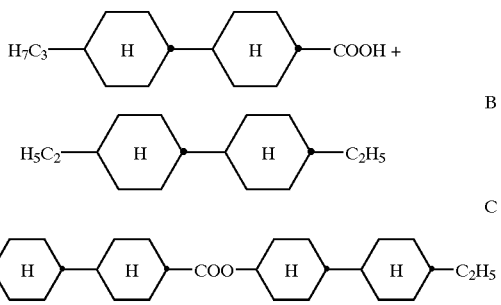

80 mmol of A, 80 mmol of B, 0.977 g of 4-(dimethylamino)pyridine in 200 ml of toluene are introduced at 5° C. as the initial charge. A solution of 88 mmol of N,N'-dicyclohexylcarbodiimide in 70 ml of toluene is added dropwise at 5–10° C. The mixture is stirred overnight at room temperature.

The final work-up follows the standard procedure. The product is recrystallized from ethyl acetate.

Step 1.2

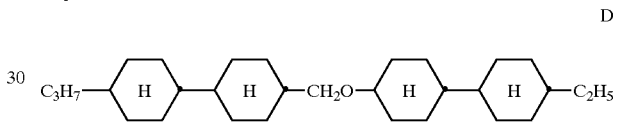

45 mmol of C are dissolved in 200 ml of anhydrous THF, and 157.5 mmol of boron trifluoride-THF complex are added dropwise at 15–25° C., the mixture being cooled with ice. To this solution, a solution of 112.5 mmol of sodium borohydride in 100 ml of diethylene glycol dimethyl ether is then added dropwise at 15–25° C. The mixture is allowed to warm to room temperature and is stirred for a further 4 h. The final work-up follows the standard procedure. The product is recrystallized from ethyl acetate.

The following compounds are prepared in a similar manner:

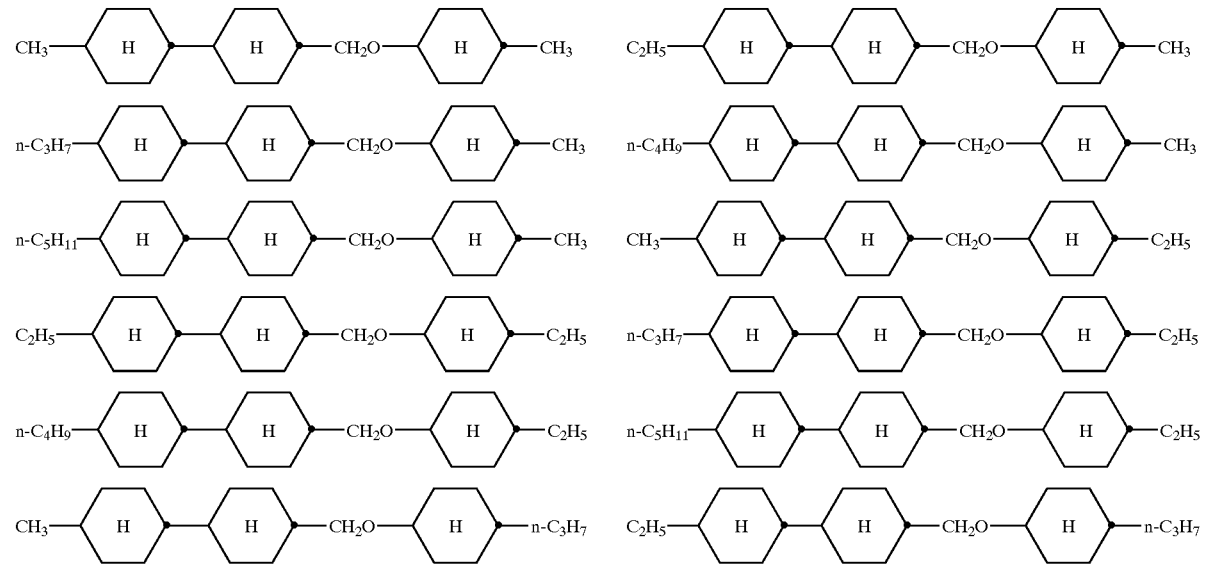

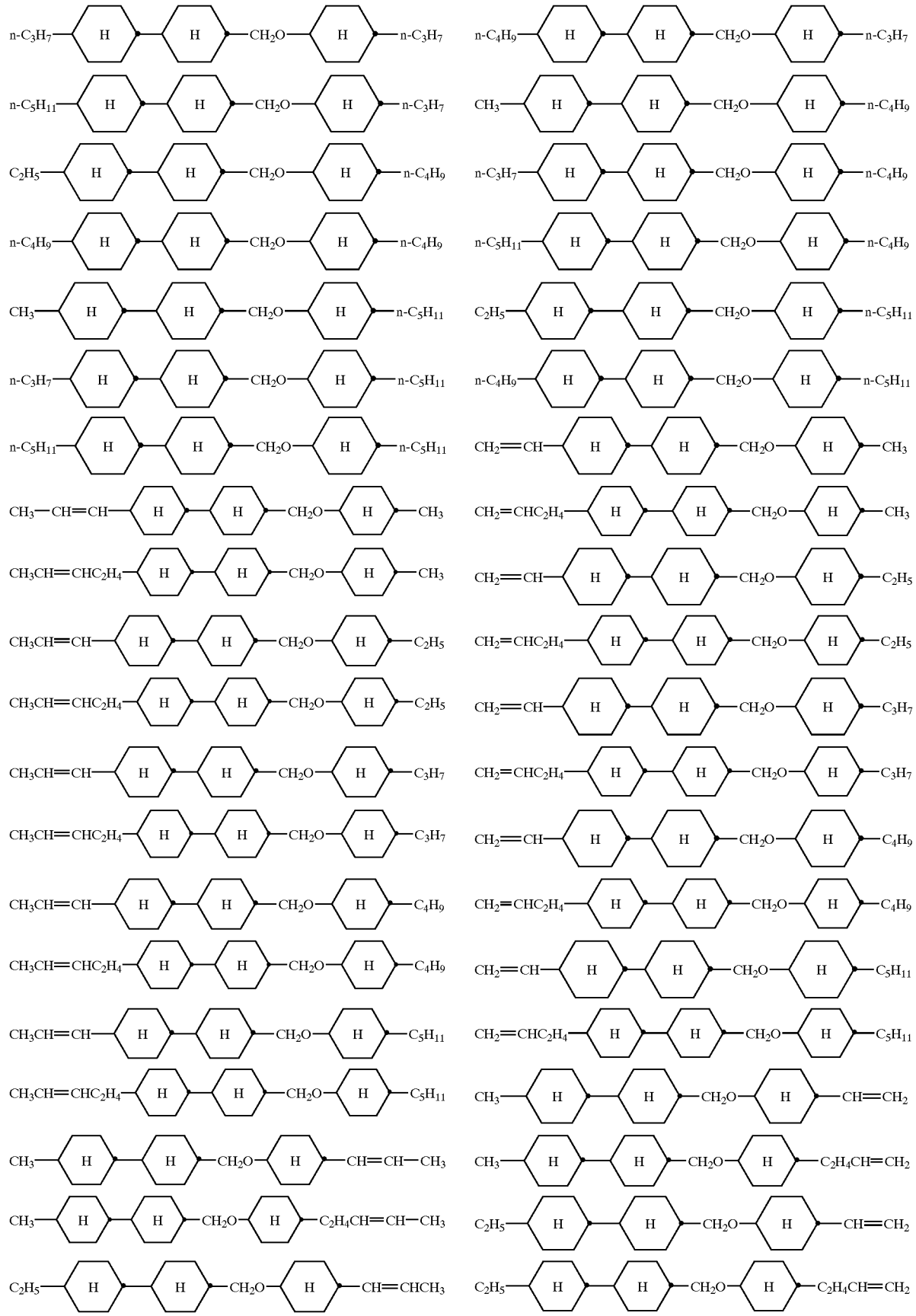

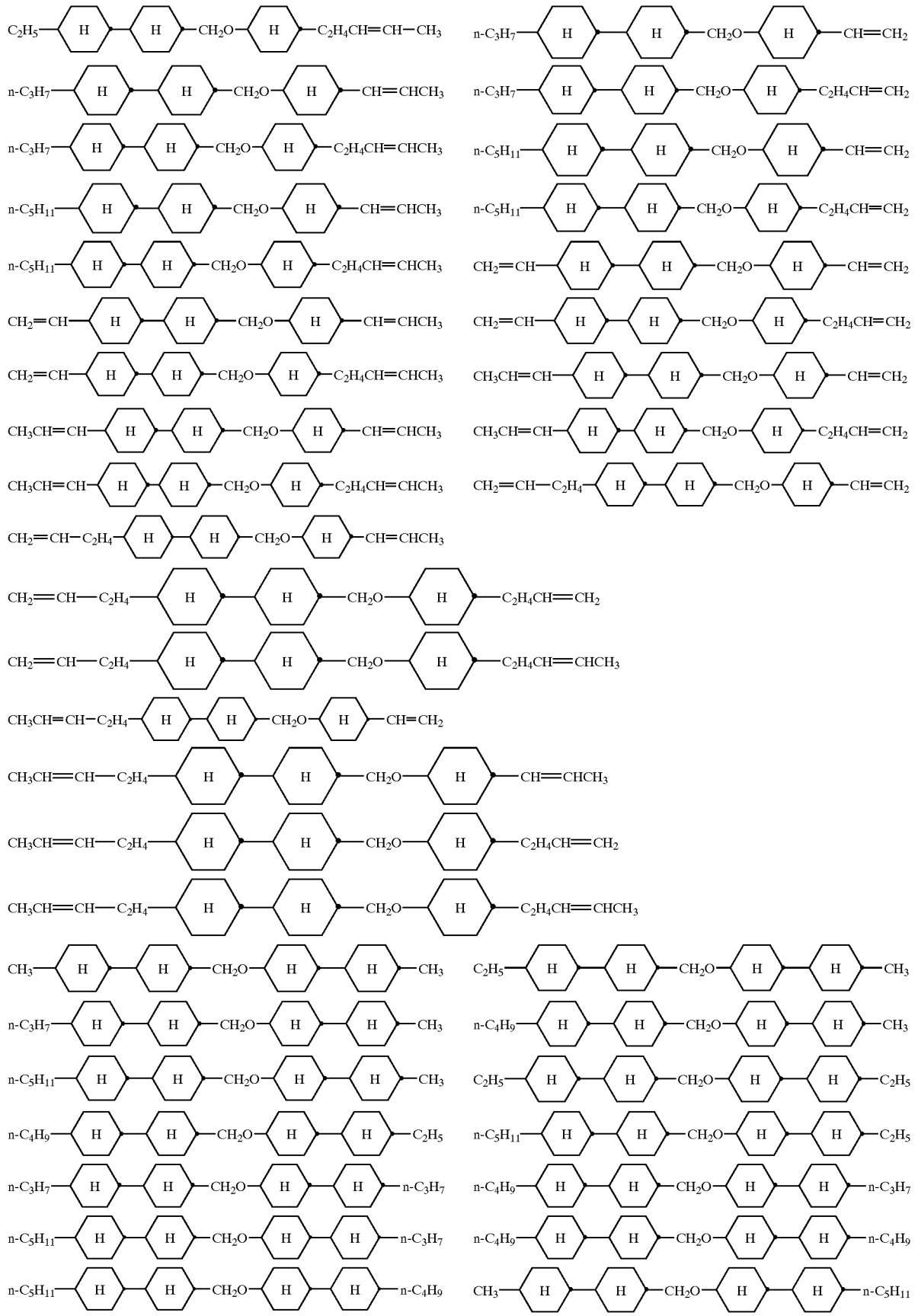

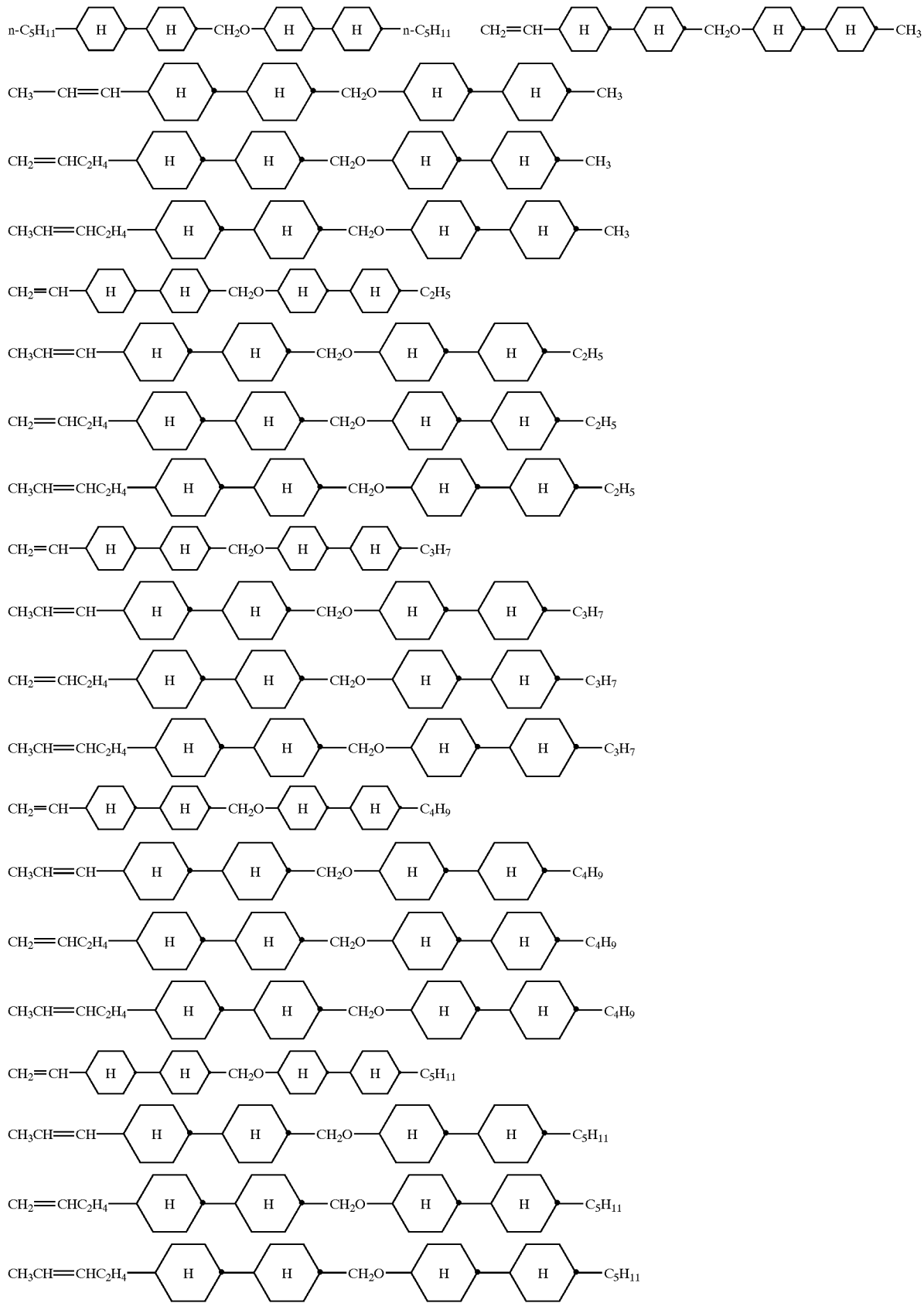

Examples of Mixtures

Example M1

| | | | |
|---|---|---|---|
| CCH-301 | 10.00% | S→N [° C.] | <-40 |
| CCH-501 | 11.00% | Clearing point [° C.] | +94.5 |
| CCH-34 | 4.00% | Δn [589 nm, 20° C.] | +0.0600 |
| CC-5-V | 15.00% | d · Δn [20° C.] [μm] | 0.50 |
| CCP-2F.F.F | 8.00% | Twist [°] | 90 |
| CDU-2-F | 4.00% | $V_{10}$ [V] | 2.26 |
| CDU-3-F | 5.00% | | |
| CCZU-2-F | 5.00% | | |
| CCZU-3-F | 3.00% | | |
| CCZU-5-F | 5.00% | | |
| CCPC-33 | 4.00% | | |
| CCPC-34 | 5.00% | | |
| CCPC-35 | 4.00% | | |
| CCOC-3-3 | 3.00% | | |
| CCOC-4-3 | 4.00% | | |
| CCOC-3-5 | 2.00% | | |
| CCH-5CF3 | 8.00% | | |

Example M2

| | | | |
|---|---|---|---|
| CCH-34 | 5.00% | S→N [° C.] | <-40 |
| CC-5-V | 12.00% | Clearing point [° C.] | +79.0 |
| CCH-5CF3 | 8.00% | Δn [589 nm, 20° C.] | +0.0648 |
| CCP-2F.F.F | 12.00% | d · Δn [20° C.] [μm] | 0.50 |
| CCP-3F.F.F | 11.00% | Twist [°] | 90 |
| CCP-5F.F.F | 6.00% | $V_{10}$ [V] | 1.55 |
| CCP-20CF3.F | 10.00% | | |
| CCP-50CF3.F | 5.00% | | |
| CCP-40CF3 | 6.00% | | |
| CDU-2-F | 6.00% | | |
| CDU-3-F | 10.00% | | |
| CCOC-3-3 | 3.00% | | |
| CCOC-4-3 | 4.00% | | |
| CCOC-3-5 | 2.00% | | |

Example M3

| | | | |
|---|---|---|---|
| CCH-34 | 5.00% | S→N [° C.] | <-40 |
| CC-5-V | 14.00% | Clearing point [° C.] | +78.5 |
| CCH-5CF3 | 8.00% | Δn [589 nm, 20° C.] | +0.0650 |
| CCP-2F.F.F | 11.00% | d · Δn [20° C.] [μm] | 0.50 |
| CCP-3F.F.F | 12.00% | Twist [°] | 90 |
| CCP-5F.F.F | 5.00% | $V_{10}$ [V] | 1.57 |
| CCP-20CF3.F | 9.00% | | |
| CCP-50CF3.F | 5.00% | | |
| CCP-40CF3 | 7.00% | | |
| CDU-2-F | 6.00% | | |
| CDU-3-F | 10.00% | | |
| CCOC-3-3 | 3.00% | | |
| CCOC-4-3 | 5.00% | | |

Example M4

| | | | |
|---|---|---|---|
| CCH-34 | 5.00% | S→N [° C.] | <-40 |
| CC-5-V | 6.00% | Clearing point [° C.] | +80.5 |
| CCH-3CF3 | 6.00% | Δn [589 nm, 20° C.] | +0.0644 |
| CCH-5CF3 | 8.00% | d · Δn [20° C.] [μm] | 0.50 |
| CCP-2F.F.F | 11.00% | Twist [°] | 90 |
| CCP-3F.F.F | 12.00% | $V_{10}$ [V] | 1.56 |
| CCP-5F.F.F | 5.00% | | |
| CCZU-2-F | 5.00% | | |
| CCZU-3-F | 15.00% | | |
| CCZU-5-F | 4.00% | | |
| CCP-20CF3.F | 10.50% | | |
| CCP-40CF3 | 6.50% | | |
| CCOC-4-3 | 4.00% | | |
| CCOC-3-3 | 2.00% | | |

Example M5

| | | | |
|---|---|---|---|
| CCH-34 | 6.00% | S→N [° C.] | <-40 |
| CCH-3CF3 | 3.00% | Clearing point [° C.] | +75.0 |
| CCH-5CF3 | 8.00% | Δn [589 nm, 20° C.] | +0.644 |
| CCP-2F.F.F | 11.00% | Δε [1 kHZ, 20° C.] | +10.1 |
| CCP-3F.F.F | 10.00% | d · Δn [20° C.] [μm] | 0.0 |
| CCP-5F.F.F | 6.00% | Twist [°] | 90 |
| CCP-20CF3.F | 4.00% | $V_{10}$ [V] | 1.34 |
| CCP-40CF3 | 8.00% | | |
| CDU-2-F | 10.00% | | |
| CDU-3-F | 12.00% | | |
| CDU-5-F | 10.00% | | |
| CCOC-3-3 | 4.00% | | |
| CCOC-4-3 | 8.00% | | |

Example M6

| | | | |
|---|---|---|---|
| CCH-34 | 5.00% | Clearing point [° C.] | +80.0 |
| CC-5-V | 8.00% | Δn [589 nm, 20° C.] | +0.0642 |
| CCH-3CF3 | 6.00% | Δε [1 kHz, 20° C.] | +7.8 |
| CCH-5CF3 | 8.00% | d · Δn [20° C.] [μm] | 0.50 |
| CCP-2F.F.F | 11.00% | Twist [°] | 90 |
| CCP-3F.F.F | 11.00% | $V_{10}$ [V] | 1.58 |
| CCP-5F.F.F | 6.00% | | |
| CCZU-2-F | 6.00% | | |
| CCZU-3-F | 14.00% | | |
| CCZU-5-F | 6.00% | | |
| CCP-20CF3.F | 8.00% | | |
| CCP-40CF3 | 4.00% | | |
| CCOC-3-3 | 5.00% | | |
| CCOC-4-3 | 2.00% | | |

Example M7

| | | | |
|---|---|---|---|
| CCH-34 | 6.00% | Clearing point [° C.] | +79.5 |
| CC-5-V | 14.00% | Δn [589 nm, 20° C.] | +0.0649 |
| CCP-2F.F.F | 11.00% | Δε [1 kHz, 20° C.] | +9.5 |
| CCP-3F.F.F | 11.00% | d · Δn [20° C.] [μm] | 0.50 |
| CCP-5F.F.F | 6.00% | Twist [°] | 90 |
| CCP-20CF3.F | 6.00% | $V_{10}$ [V] | 1.38 |
| CDU-2-F | 10.00% | | |
| CDU-3-F | 14.00% | | |
| CDU-5-F | 10.00% | | |
| CCOC-3-3 | 4.00% | | |
| CCOC-4-3 | 8.00% | | |

Example M8

| | |
|---|---|
| CCH-34 | 6.00% |
| CCH-501 | 8.00% |
| CCP-2F.F.F | 11.00% |
| CCP-3F.F.F | 11.00% |

-continued

| | |
|---|---|
| CCP-5F.F.F | 6.00% |
| CCP-20CF3.F | 4.00% |
| CCP-40CF3 | 6.00% |
| CDU-2-F | 12.00% |
| CDU-3-F | 16.00% |
| CDU-5-F | 8.00% |
| CCOC-3-3 | 4.00% |
| CCOC-4-3 | 8.00% |

Example M9

| | | | |
|---|---|---|---|
| CCH-34 | 5.00% | S→N [° C.] | <−40 |
| CC-5-V | 8.00% | Clearing point [° C.] | +80.5 |
| CCH-3CF3 | 6.00% | Δn [589 nm, 20° C.] | +0.0643 |
| CCH-5CF3 | 8.00% | Δε [1 kHz, 20° C.] | +7.8 |
| CCP-2F.F.F | 11.00% | d · Δn [20° C.] [μm] | 0.50 |
| CCP-3F.F.F | 11.00% | Twist [°] | 90 |
| CCP-5F.F.F | 6.00% | $V_{10}$ [V] | 1.59 |
| CCZU-2-F | 5.00% | | |
| CCZU-3-F | 15.00% | | |
| CCZU-5-F | 5.00% | | |
| CCP-20CF3.F | 8.00% | | |
| CCP-40CF3 | 5.00% | | |
| CCOC-4-3 | 5.00% | | |
| CCOC-3-3 | 2.00% | | |

Example M10

| | | | |
|---|---|---|---|
| CCH-34 | 5.00% | S→N [° C.] | <−40 |
| CC-5-V | 6.00% | Clearing point [° C.] | +80.0 |
| CCH-3CF3 | 6.00% | Δn [589 nm, 20° C.] | +0.0648 |
| CCH-5CF3 | 6.00% | Δε [1 Khz, 20° C.] | +8.0 |
| CCP-2F.F.F | 12.00% | d.Δn [20° C.] [μm] | 0.50 |
| CCP-3F.F.F | 11.00% | Twist [°] | 90 |
| CCP-5F.F.F | 6.00% | $V_{10}$ [V] | 1.54 |
| CCP-20CF3.F | 8.00% | | |
| CCP-50CF3.F | 8.00% | | |
| CCP-40CF3 | 6.00% | | |
| CDU-2-F | 6.00% | | |
| CDU-3-F | 8.00% | | |
| CCOC-3-3 | 4.00% | | |
| CCOC-4-3 | 8.00% | | |

Example M11

| | | | |
|---|---|---|---|
| CCH-34 | 5.00% | Clearing point [° C.] | +80.0 |
| CC-5-V | 12.00% | Δn [589 nm, 20° C.] | +0.0644 |
| CCH-3CF3 | 5.00% | d.Δn [20° C.] [μm] | 0.50 |
| CCH-5CF3 | 8.00% | Twist [°] | 90 |
| CCP-2F.F.F | 12.00% | $V_{10}$ [V] | 1.63 |
| CCP-3F.F.F | 11.00% | | |
| CCP-5F.F.F | 6.00% | | |
| CCP-20CF3.F | 8.00% | | |
| CCP-50CF3.F | 3.00% | | |
| CCP-40CF3 | 8.00% | | |
| DCZG-2-OT | 4.00% | | |
| DCZG-3-OT | 4.00% | | |
| DCZG-5-OT | 6.00% | | |
| CCOC-3-3 | 2.00% | | |
| CCOC-4-3 | 6.00% | | |

Example M12

| | | | |
|---|---|---|---|
| CCH-34 | 5.00% | S→N [° C.] | <−40.0 |
| CC-5-V | 6.00% | Clearing point [° C.] | +80.5 |
| CCH-3CF3 | 6.00% | Δn [589 nm, 20° C.] | +0.0654 |
| CCH-5CF3 | 8.00% | d.Δn [20° C.] [μm] | 0.50 |
| CCP-2F.F.F | 12.00% | Twist [°] | 90 |
| CCP-3F.F.F | 11.00% | $V_{10}$ [V] | 1.53 |
| CCP-5F.F.F | 6.00% | | |
| CCZU-2-F | 5.00% | | |
| CCZU-3-F | 14.00% | | |
| CCZU-5-F | 5.00% | | |
| CCP-20CF3.F | 9.00% | | |
| CCP-40CF3 | 7.00% | | |
| CCOC-3-3 | 4.00% | | |
| CCOC-4-3 | 2.00% | | |

Example M13

| | | | |
|---|---|---|---|
| CCH-34 | 4.00% | S→N [° C.] | <−40 |
| CC-3-DT | 12.00% | Clearing point [° C.] | +81.0 |
| CCH-5CF3 | 8.00% | Δn [589 nm, 20° C.] | +0.0647 |
| CCP-2F.F.F | 12.00% | d.Δn [20° C.] [μm] | 0.50 |
| CCP-3F.F.F | 11.00% | Twist [°] | 90 |
| CCP-5F.F.F | 6.00% | $V_{10}$ [V] | 1.53 |
| CCZU-2-F | 4.00% | | |
| CCZU-3-F | 10.00% | | |
| CCZU-5-F | 4.00% | | |
| CCP-20CF3.F | 8.00% | | |
| CCP-50CF3.F | 6.00% | | |
| CCP-40CF3 | 7.00% | | |
| CCOC-4-3 | 5.00% | | |
| CCOC-3-3 | 3.00% | | |

Example M14

| | |
|---|---|
| CCH-34 | 5.00% |
| CCH-35 | 4.00% |
| CC-3-V1 | 12.00% |
| CC-5-V | 17.00% |
| CCH-3CF3 | 4.00% |
| CCH-5CF3 | 8.00% |
| CCP-2F.F.F | 10.00% |
| CCZU-2-F | 5.00% |
| CCZU-3-F | 12.00% |
| CCZU-5-F | 5.00% |
| CCOC-3-3 | 3.00% |
| CCOC-4-3 | 4.00% |
| CCOC-3-5 | 2.00% |
| CH-43 | 3.00% |
| CH-33 | 3.00% |
| CH-35 | 3.00% |

Example M15

| | |
|---|---|
| CCH-34 | 5.00% |
| CC-3-V1 | 13.00% |
| CC-5-V | 14.00% |
| CC-3-DT | 13.00% |
| CCH-5CF3 | 6.00% |
| CCP-2F.F.F | 10.00% |
| CCP-5F.F.F | 3.00% |
| CCP-40CF3 | 4.00% |
| CCZU-2-F | 5.00% |
| CCZU-3-F | 6.00% |

Example M16

| | |
|---|---|
| CCZU-5-F | 5.00% |
| CCOC-3-3 | 3.00% |
| CCOC-4-3 | 4.00% |
| CH-43 | 3.00% |
| CH-33 | 3.00% |
| CH-35 | 3.00% |

Example M16

| | |
|---|---|
| CCH-34 | 5.00% |
| CC-3-V1 | 12.00% |
| CC-5-V | 17.00% |
| CCH-3CF3 | 8.00% |
| CCH-5CF3 | 8.00% |
| CCP-2F.F.F | 11.00% |
| CCP-5F.F.F | 3.00% |
| CCP-40CF3 | 2.00% |
| CCZU-2-F | 5.00% |
| CCZU-3-F | 7.00% |
| CCZU-5-F | 6.00% |
| CCOC-3-3 | 3.00% |
| CCOC-4-3 | 4.00% |
| CH-43 | 3.00% |
| CH-33 | 3.00% |
| CH-35 | 3.00% |

Example M17

| | | | |
|---|---|---|---|
| CCH-34 | 5.00% | S→N [° C.] | <−40 |
| CC-5-V | 12.00% | Clearing point [° C.] | +79.0 |
| CCH-5CF3 | 8.00% | Δn [589 nm, 20° C.] | +0.0648 |
| CCP-2F.F.F | 12.00% | d.Δn [20° C.] [μm] | 0.50 |
| CCP-3F.F.F | 11.00% | Twist [°] | 90 |
| CCP-5F.F.F | 6.00% | $V_{10}$ [V] | 1.55 |
| CCP-20CF3.F | 10.00% | | |
| CCP-50CF3.F | 5.00% | | |
| CCP-40CF3 | 6.00% | | |
| CDU-2-F | 6.00% | | |
| CDU-3-F | 10.00% | | |
| CCOC-3-3 | 3.00% | | |
| CCOC-4-3 | 4.00% | | |
| CCOC-4-5 | 2.00% | | |

Example M18

| | | | |
|---|---|---|---|
| CCH-34 | 5.00% | S→N [° C.] | <−40 |
| CC-5-V | 11.00% | Clearing point [° C.] | +79.5 |
| CCH-5CF3 | 8.00% | Δn [589 nm, 20° C.] | +0.0653 |
| CCP-2F.F.F | 12.00% | d.Δn [20° C.] [μm] | 0.50 |
| CCP-3F.F.F | 11.50% | Twist [°] | 90 |
| CCP-5F.F.F | 5.50% | $V_{10}$ [V] | 1.54 |
| CCP-20CF3.F | 11.00% | | |
| CCP-50CF3.F | 7.00% | | |
| CCP-40CF3 | 5.00% | | |
| CDU-2-F | 7.00% | | |
| CDU-3-F | 8.00% | | |
| CCOC-3-3 | 3.00% | | |
| CCOC-4-3 | 4.00% | | |
| CCOC-4-5 | 2.00% | | |

Example M19

| | | | |
|---|---|---|---|
| CCH-34 | 5.00% | S→N [° C.] | <−40 |
| CC-5-V | 6.00% | Clearing point [° C.] | +80.5 |
| CCH-3CF3 | 6.00% | Δn [589 nm, 20° C.] | +0.0644 |
| CCH-5CF3 | 8.00% | d.Δn [20° C.] [μm] | 0.50 |
| CCP-2F.F.F | 11.00% | Twist [°] | 90 |
| CCP-3F.F.F | 12.00% | $V_{10}$ [V] | 1.56 |
| CCP-5F.F.F | 5.00% | | |
| CCZU-2-F | 5.00% | | |
| CCZU-3-F | 15.00% | | |
| CCZU-5-F | 4.00% | | |
| CCP-20CF3.F | 10.50% | | |
| CCP-40CF3 | 6.50% | | |
| CCOC-4-3 | 4.00% | | |
| CCOC-3-3 | 2.00% | | |

Example M20

| | |
|---|---|
| CCH-301 | 6.00% |
| CCH-302 | 12.00% |
| CCH-501 | 18.00% |
| CC-5-V | 4.00% |
| CCP-20CF3.F | 7.00% |
| CCP-50CF3.F | 5.00% |
| CCP-40CF3 | 7.00% |
| CCZU-2-F | 5.00% |
| CCZU-3-F | 15.00% |
| CCZU-5-F | 5.00% |
| CCOC-3-3 | 6.00% |
| CCOC-4-3 | 6.00% |
| CCOC-3-5 | 4.00% |

Example M21

| | |
|---|---|
| CCH-302 | 12.00% |
| CCH-501 | 18.00% |
| CC-5-V | 5.00% |
| CCH-34 | 5.00% |
| CCP-3F.F.F | 4.00% |
| CCP-20CF3.F | 8.00% |
| CCP-20CF3 | 2.00% |
| CCP-40CF3 | 6.00% |
| CCZU-2-F | 5.00% |
| CCZU-3-F | 15.00% |
| CCZU-5-F | 4.00% |
| CCOC-3-3 | 6.00% |
| CCOC-4-3 | 6.00% |
| CCOC-3-5 | 4.00% |

Example M22

| | | | |
|---|---|---|---|
| CCH-301 | 20.00% | S→N [° C.] | <−40 |
| CCH-501 | 15.50% | Clearing point [° C.] | +93.5 |
| CC-5-V | 11.50% | Δn [589 nm, 20° C.] | +0.0605 |
| CDU-2-F | 6.00% | d.Δn [20° C.] [μm] | 0.50 |
| CDU-3-F | 6.00% | Twist [°] | 90 |
| CDU-5-F | 3.00% | $V_{10}$ [V] | 2.18 |
| CCZU-2-F | 3.00% | | |
| CCZU-3-F | 11.00% | | |
| CCZU-5-F | 3.00% | | |
| CCPC-33 | 5.00% | | |
| CCPC-34 | 4.00% | | |
| CCPC-35 | 4.00% | | |
| CCOC-3-3 | 3.00% | | |

-continued

| | |
|---|---|
| CCOC-4-3 | 3.00% |
| CCOC-3-5 | 2.00% |

Example M23

| | | | |
|---|---|---|---|
| CCH-301 | 20.00% | S→N [° C.] | <−40 |
| CCH-501 | 14.00% | Clearing point [° C.] | +94.5 |
| CCH-34 | 3.00% | Δn [589 nm, 20° C.] | +0.0604 |
| CC-5-V | 10.00% | d · Δn [20° C.] [μm] | 0.50 |
| CCP-2F.F.F | 4.00% | Twist [°] | 90 |
| CDU-2-F | 3.00% | $V_{10}$ [V] | 2.21 |
| CDU-3-F | 7.00% | | |
| CDU-5-F | 3.00% | | |
| CCZU-2-F | 3.00% | | |
| CCZU-3-F | 10.00% | | |
| CCZU-5-F | 2.00% | | |
| CCPC-33 | 5.00% | | |
| CCPC-34 | 4.00% | | |
| CCPC-35 | 4.00% | | |
| CCOC-3-3 | 2.00% | | |
| CCOC-4-3 | 4.00% | | |
| CCOC-3-5 | 2.00% | | |

Example M24

| | | | |
|---|---|---|---|
| CCH-301 | 14.00% | S→N [° C.] | <−40 |
| CCH-501 | 14.00% | Clearing point [° C.] | +97.5 |
| CCH-34 | 4.00% | Δn [589 nm, 20° C.] | +0.0616 |
| CC-5-V | 12.00% | d · Δn [20° C.] [μm] | 0.50 |
| CCP-2F.F.F | 8.00% | Twist [°] | 90 |
| CCP-3F.F.F | 2.00% | $V_{10}$ [V] | 2.19 |
| CCP-5F.F.F | 3.00% | | |
| CDU-2-F | 4.00% | | |
| CDU-3-F | 6.00% | | |
| CCZU-2-F | 3.00% | | |
| CCZU-3-F | 9.00% | | |
| CCPC-33 | 4.00% | | |
| CCPC-34 | 4.00% | | |
| CCPC-35 | 4.00% | | |
| CCOC-3-3 | 3.00% | | |
| CCOC-4-3 | 4.00% | | |
| CCOC-3-5 | 2.00% | | |

Example M25

| | | | |
|---|---|---|---|
| CCH-301 | 10.00% | S→N [° C.] | <−40 |
| CCH-501 | 14.00% | Clearing point [° C.] | +95.5 |
| CCH-34 | 5.00% | Δn [589 nm, 20° C.] | +0.0609 |
| CC-5-V | 9.00% | d · Δn [20° C.] [μm] | 0.50 |
| CCH-5CF3 | 6.00% | Twist [°] | 90 |
| CCP-2F.F.F | 9.00% | $V_{10}$ [V] | 2.22 |
| CCP-3F.F.F | 5.00% | | |
| CCP-5F.F.F | 4.00% | | |
| CDU-3-F | 7.00% | | |
| CCZU-2-F | 3.00% | | |
| CCZU-3-F | 6.00% | | |
| CCPC-33 | 4.00% | | |
| CCPC-34 | 4.00% | | |
| CCPC-35 | 4.00% | | |
| CCOC-3-3 | 3.00% | | |
| CCOC-4-3 | 5.00% | | |
| CCOC-3-5 | 2.00% | | |

Example M26

| | | | |
|---|---|---|---|
| CCH-301 | 10.00% | S→N [° C.] | <−40 |
| CCH-501 | 11.00% | Clearing point [° C.] | +94.5 |
| CCH-34 | 4.00% | Δn [589 nm, 20° C.] | +0.0600 |
| CC-5-V | 15.00% | d · Δn [20° C.] [μm] | 0.50 |
| CCP-2F.F.F | 8.00% | Twist [°] | 90 |
| CDU-2-F | 4.00% | $V_{10}$ [V] | 2.26 |
| CDU-3-F | 5.00% | | |
| CCZU-2-F | 5.00% | | |
| CCZU-3-F | 3.00% | | |
| CCZU-5-F | 5.00% | | |
| CCPC-33 | 4.00% | | |
| CCPC-34 | 5.00% | | |
| CCPC-35 | 4.00% | | |
| CCOC-3-3 | 3.00% | | |
| CCOC-4-3 | 4.00% | | |
| CCOC-4-5 | 2.00% | | |
| CCH-5CF3 | 8.00% | | |

Example M27

| | | | |
|---|---|---|---|
| CCH-34 | 5.00% | S→N [° C.] | <−40 |
| CC-5-V | 10.00% | Clearing point [° C.] | +78.5 |
| CCH-301 | 8.00% | Δn [589 nm, 20° C.] | +0.0655 |
| CCP-2F.F.F | 11.00% | d · Δn [20° C.] [μm] | 0.50 |
| CCP-3F.F.F | 12.00% | Twist [°] | 90 |
| CCP-5F.F.F | 5.00% | $V_{10}$ [V] | 1.51 |
| CCP-20C.F3.F | 10.00% | | |
| CCP-50C.F3.F | 6.00% | | |
| CCP-40CF3 | 6.00% | | |
| CDU-2-F | 9.00% | | |
| CDU-3-F | 10.00% | | |
| CCOC-3-3 | 3.00% | | |
| CCOC-4-3 | 5.00% | | |

Example M28

| | | | |
|---|---|---|---|
| CCH-34 | 5.00% | S→N [° C.] | <−40 |
| CC-5-V | 14.00% | Clearing point [° C.] | +78.5 |
| CCH-5CF3 | 8.00% | Δn [589 nm, 20° C.] | +0.0650 |
| CCP-2F.F.F | 11.00% | d · Δn [20° C.] [μm] | 0.50 |
| CCP-3F.F.F | 12.00% | Twist [°] | 90 |
| CCP-5F.F.F | 5.00% | $V_{10}$ [V] | 1.57 |
| CCP-20CF3.F | 9.00% | | |
| CCP-50CF3.F | 5.00% | | |
| CCP-40CF3 | 7.00% | | |
| CDU-2-F | 6.00% | | |
| CDU-3-F | 10.00% | | |
| CCOC-3-3 | 3.00% | | |
| CCOC-4-3 | 5.00% | | |

Example M29

| | |
|---|---|
| CCH-34 | 5.00% |
| CC-5-V | 12.00% |
| CCH-5CF3 | 4.00% |
| CCH-3CF3 | 3.00% |
| CCP-2F.F.F | 12.00% |
| CCP-3F.F.F | 11.00% |
| CCP-5F.F.F | 7.00% |
| CCP-20CF3.F | 10.00% |
| CCP-50CF3.F | 5.00% |
| CCP-40CF3 | 6.00% |
| CDU-2-F | 6.00% |

Example M30 (continued)

| | |
|---|---|
| CDU-3-F | 10.00% |
| CCOC-3-3 | 4.00% |
| CCOC-4-3 | 5.00% |

Example M31

| | |
|---|---|
| CCH-35 | 5.00% |
| CC-5-V | 12.00% |
| CCH-5CF3 | 4.00% |
| CCH-3CF3 | 3.00% |
| CCP-2F.F.F | 12.00% |
| CCP-3F.F.F | 11.00% |
| CCP-5F.F.F | 7.00% |
| CCP-2OCF3.F | 10.00% |
| CCP-5OCF3.F | 5.00% |
| CCP-4OCF3 | 6.00% |
| CDU-2-F | 6.00% |
| CDU-3-F | 10.00% |
| CCOC-3-3 | 4.00% |
| CCOC-4-3 | 5.00% |

Example M32

| | | | |
|---|---|---|---|
| CCH-35 | 5.00% | Clearing point [° C.] | +78.5 |
| CC-5-V | 14.00% | Δn [589 nm, 20° C.] | +0.0654 |
| CCH-5CF3 | 8.00% | | |
| CCP-2F.F.F | 11.00% | | |
| CCP-3F.F.F | 12.00% | | |
| CCP-5F.F.F | 5.00% | | |
| CCP-2OCF3.F | 9.00% | | |
| CCP-5OCF3.F | 5.00% | | |
| CCP-4OCF3 | 7.00% | | |
| CDU-2-F | 6.00% | | |
| CDU-3-F | 10.00% | | |
| CCOC-3-3 | 3.00% | | |
| CCOC-4-3 | 5.00% | | |

Example M33

| | | | |
|---|---|---|---|
| CCH-301 | 14.00% | Clearing point [° C.] | +95.0 |
| CCH-501 | 14.00% | Δn [589 nm, 20° C.] | +0.0611 |
| CCH-35 | 5.00% | d · Δn [20° C.] [μm] | 0.50 |
| CC-5-V | 11.00% | Twist [°] | 90 |
| CCP-2F.F.F | 9.00% | $V_{10}$ [V] | 2.22 |
| CCP-3F.F.F | 4.00% | | |
| CCP-5F.F.F | 5.00% | | |
| CDU-2-F | 6.00% | | |
| CDU-3-F | 9.00% | | |
| CCPC-33 | 5.00% | | |
| CCPC-34 | 4.00% | | |
| CCPC-35 | 4.00% | | |
| CCOC-3-3 | 3.00% | | |
| CCOC-4-3 | 5.00% | | |
| CCOC-3-5 | 2.00% | | |

| | |
|---|---|
| CCH-301 | 14.00% |
| CCH-501 | 14.00% |
| CCH-35 | 5.00% |

(continued)

| | | | |
|---|---|---|---|
| CC-5-V | 11.00% | Twist [°] | 90 |
| CCP-2F.F.F | 11.00% | $V_{10}$ [V] | 2.20 |
| CCP-5F.F.F | 6.00% | | |
| CDU-2-F | 6.00% | | |
| CDU-3-F | 10.00% | | |
| CCPC-33 | 4.00% | | |
| CCPC-34 | 4.00% | | |
| CCPC-35 | 5.00% | | |
| CCOC-3-3 | 3.00% | | |
| CCOC-4-3 | 5.00% | | |
| CCOC-3-5 | 2.00% | | |

Example M34

| | | | |
|---|---|---|---|
| CCH-301 | 16.00% | S→N [° C.] | <−40 |
| CCH-501 | 16.00% | Clearing point [° C.] | 95.5 |
| CCH-35 | 3.00% | Δn [589 nm, 20° C.] | +0.0608 |
| CCH-5CF3 | 5.00% | Δε [1 kHz, 20° C.] | +4.5 |
| CCP-2F.F.F | 10.00% | d · Δn [20° C.] [μm] | 0.50 |
| CCP-5F.F.F | 8.00% | Twist [°] | 90 |
| CCZU-2-F | 4.00% | $V_{10}$ [V] | 2.13 |
| CCZU-3-F | 13.00% | | |
| CCZU-5-F | 4.00% | | |
| CCPC-33 | 3.00% | | |
| CCPC-34 | 4.00% | | |
| CCPC-35 | 4.00% | | |
| CCOC-3-3 | 3.00% | | |
| CCOC-4-3 | 5.00% | | |
| CCOC-3-5 | 2.00% | | |

Example M35

| | | | |
|---|---|---|---|
| CCH-3CF3 | 7.00% | Clearing point [° C.] | +80.0 |
| CCH-301 | 6.00% | Δn [589 nm, 20° C.] | +0.0689 |
| CCH-501 | 5.00% | d · Δn [20° C.] [μm] | 0.50 |
| CCP-2F.F.F | 10.00% | Twist [°] | 90 |
| CCP-3F.F.F | 13.00% | $V_{10}$ [V] | 1.40 |
| CCP-5F.F.F | 5.00% | | |
| CCZU-3-F | 13.00% | | |
| CCZU-5-F | 7.00% | | |
| CCP-5OCF2.F.F | 8.00% | | |
| CDU-3-F | 9.00% | | |
| CCPC-3OCF3.F | 7.00% | | |
| CCPC-5OCF3.F | 7.00% | | |
| CCOC-3-3 | 3.00% | | |

Example M36

| | | | |
|---|---|---|---|
| CCH-3CF3 | 8.00% | Clearing point [° C.] | +81.0 |
| CCH-5CF3 | 5.00% | Δn [589 nm, 20° C.] | +0.0655 |
| CCH-301 | 9.00% | Δε [1 kHz, 20° C.] | +8.7 |
| CCP-2F.F.F | 8.00% | d · Δn [20° C.] [μm] | 0.50 |
| CCP-3F.F.F | 13.00% | Twist [°] | 90 |
| CCP-5F.F.F | 5.00% | $V_{10}$ [V] | 1.47 |
| CCZU-2-F | 5.00% | | |
| CCZU-3-F | 8.00% | | |
| CCZU-5-F | 5.00% | | |
| CCP-3OCF3.F | 8.00% | | |
| CCP-5OCF2.F.F | 8.00% | | |
| CDU-3-F | 9.00% | | |
| CCOC-3-3 | 5.00% | | |
| CPCC-2-3 | 4.00% | | |

Example M37

| | |
|---|---|
| CCH-3CF3 | 8.00% |
| CCH-5CF3 | 5.00% |
| CCH-301 | 8.00% |
| CCP-2F.F.F | 8.00% |
| CCP-3F.F.F | 13.00% |
| CCP-5F.F.F | 5.00% |
| CCZU-2-F | 7.00% |
| CCZU-3-F | 15.00% |
| CCZU-5-F | 7.00% |
| CCP-5OCF2.F.F | 4.00% |
| CDU-3-F | 10.00% |
| CCOC-3-3 | 6.00% |
| CPCC-2-3 | 4.00% |

Example M38

| | | | |
|---|---|---|---|
| CCH-3CF3 | 8.00% | Clearing point [° C.] | +77.0 |
| CCH-5CF3 | 5.00% | Δn [589 nm, 20° C.] | +0.0663 |
| CCH-301 | 8.00% | d · Δn [20° C.] [μm] | 0.50 |
| CCP-2F.F.F | 4.00% | Twist [°] | 90 |
| CCP-3F.F.F | 13.00% | $V_{10}$ [V] | 1.38 |
| CCP-5F.F.F | 5.00% | | |
| CCZU-3-F | 8.00% | | |
| CCZU-5-F | 5.00% | | |
| CCP-30CF3.F | 8.00% | | |
| CCP-5OCF2.F.F | 8.00% | | |
| CDU-2-F | 9.00% | | |
| CDU-3-F | 10.00% | | |
| CCOC-3-3 | 5.00% | | |
| CPCC-2-3 | 4.00% | | |

Example M39

| | | | |
|---|---|---|---|
| CCH-3CF3 | 11.00% | Clearing point [° C.] | +79.5 |
| CCH-5CF3 | 7.00% | Δn [589 nm, 20° C.] | +0.0656 |
| CCP-2F.F.F | 4.00% | d · Δn [20° C.] [μm] | 0.50 |
| CCP-3F.F.F | 10.00% | Twist [°] | 90 |
| CCP-5F.F.F | 5.00% | $V_{10}$ [V] | 1.38 |
| CCZU-3-F | 9.00% | | |
| CCZU-5-F | 5.00% | | |
| CCP-30CF3.F | 8.00% | | |
| CCP-5OCF2.F.F | 5.00% | | |
| CDU-2-F | 9.00% | | |
| CDU-3-F | 10.00% | | |
| CDU-5-F | 5.00% | | |
| CCOC-3-3 | 8.00% | | |
| CPCC-2-3 | 4.00% | | |

Example M40

| | | | |
|---|---|---|---|
| CCH-3CF3 | 11.00% | Clearing point [° C.] | +79.5 |
| CCH-5CF3 | 9.00% | Δn [589 nm, 20° C.] | +0.0670 |
| CCP-2F.F.F | 4.00% | d · Δn [20° C.] [μm] | 0.50 |
| CCP-3F.F.F | 10.00% | Twist [°] | 90 |
| CCP-5F.F.F | 5.00% | $V_{10}$ [V] | 1.36 |
| CCP-30CF3.F | 8.00% | | |
| CCP-5OCF2.F.F | 5.00% | | |
| CDU-2-F | 9.00% | | |
| CDU-3-F | 10.00% | | |
| CDU-5-F | 5.00% | | |
| CCOC-3-3 | 7.00% | | |
| CPCC-2-3 | 8.00% | | |
| DCZU-3-F | 9.00% | | |

Example M41

| | |
|---|---|
| CCH-3CF3 | 7.00% |
| CCH-5CF3 | 7.00% |
| CCP-2F.F.F | 4.00% |
| CCP-3F.F.F | 10.00% |
| CCP-5F.F.F | 5.00% |
| CCZU-3-F | 9.00% |
| CCZU-5-F | 5.00% |
| CCP-30CF3.F | 8.00% |
| CCP-5OCF2.F.F | 5.00% |
| CDU-2-F | 9.00% |
| CDU-3-F | 12.00% |
| CDU-5-F | 5.00% |
| CCOC-3-3 | 8.00% |
| CCOC-3-5 | 6.00% |

Example M42

| | |
|---|---|
| CCH-3CF3 | 6.00% |
| CCH-34 | 6.00% |
| CCP-2F.F.F | 11.00% |
| CCP-3F.F.F | 11.00% |
| CCP-5F.F.F | 6.00% |
| CCP-20CF3.F | 12.00% |
| CCP-5OCF3.F | 7.00% |
| CDU-2-F | 11.00% |
| CDU-3-F | 12.00% |
| CDU-5-F | 10.00% |
| CCOC-3-3 | 8.00% |

Example M43

| | |
|---|---|
| CCH-3CF3 | 11.00% |
| CCH-5CF3 | 6.00% |
| CCP-2F.F.F | 4.00% |
| CCP-3F.F.F | 10.00% |
| CCP-5F.F.F | 5.00% |
| CCZU-3-F | 9.00% |
| CCZU-5-F | 5.00% |
| CCP-30CF3.F | 8.00% |
| CCP-5OCF2.F.F | 5.00% |
| CDU-2-F | 9.00% |
| CDU-3-F | 10.00% |
| CDU-5-F | 5.00% |
| CCOC-3-3 | 8.00% |
| DCC-3-5 | 5.00% |

Example M44

| | |
|---|---|
| CCH-5CF3 | 4.00% |
| CCH-34 | 6.00% |
| CCP-2F.F.F | 11.00% |
| CCP-3F.F.F | 11.00% |
| CCP-5F.F.F | 6.00% |
| CCP-20CF3.F | 14.00% |
| CCP-5OCF3.F | 9.00% |
| CDU-2-F | 11.00% |
| CDU-3-F | 12.00% |
| CDU-5-F | 8.00% |
| CCOC-3-3 | 8.00% |

Example M45

| | | | |
|---|---|---|---|
| CCH-5CF3 | 7.00% | S→N [° C.] | <−40 |
| CCH-34 | 6.00% | Clearing point [° C.] | +74.5 |
| CCP-2F.F.F | 11.00% | Δn [589 nm, 20° C.] | +0.0670 |
| CCP-3F.F.F | 11.00% | d · Δn [20° C.] [μm] | 0.50 |
| CCP-5F.F.F | 6.00% | Twist [°] | 90 |
| CCP-20CF3.F | 12.00% | $V_{10}$ [V] | 1.31 |
| CCP-40CF3 | 8.00% | | |
| CDU-2-F | 11.00% | | |
| CDU-3-F | 12.00% | | |
| CDU-5-F | 8.00% | | |
| CCOC-3-3 | 8.00% | | |

Example M46

| | |
|---|---|
| CCH-5CF3 | 7.00% |
| CCH-34 | 6.00% |
| CCP-2F.F.F | 11.00% |
| CCP-3F.F.F | 11.00% |
| CCP-5F.F.F | 6.00% |
| CCP-20CF3.F | 6.00% |
| CCP-40CF3 | 8.00% |
| CDU-2-F | 11.00% |
| CDU-3-F | 12.00% |
| CDU-5-F | 8.00% |
| CCOC-3-3 | 8.00% |
| CCOC-3-5 | 6.00% |

Example M47

| | | | |
|---|---|---|---|
| CCH-34 | 6.00% | Clearing point [° C.] | +82.5 |
| CCH-501 | 6.00% | Δn [589 nm, 20° C.] | +0.0662 |
| CCP-2F.F.F | 11.00% | d · Δn [20° C.] [μm] | 0.50 |
| CCP-3F.F.F | 11.00% | Twist [°] | 90 |
| CCP-5F.F.F | 6.00% | $V_{10}$ [V] | 1.37 |
| CCP-20CF3.F | 6.00% | | |
| CCP-40CF3 | 5.00% | | |
| CDU-2-F | 12.00% | | |
| CDU-3-F | 15.00% | | |
| CDU-5-F | 8.00% | | |
| CCOC-3-3 | 8.00% | | |
| CCOC-3-5 | 6.00% | | |

Example M48

| | | | |
|---|---|---|---|
| CCH-34 | 6.00% | Clearing point [° C.] | +79.0 |
| CCH-501 | 8.00% | Δn [589 nm, 20° C.] | +0.0656 |
| CCP-2F.F.F | 11.00% | d · Δn [20° C.] [μm] | 0.50 |
| CCP-3F.F.F | 11.00% | Twist [°] | 90 |
| CCP-5F.F.F | 6.00% | $V_{10}$ [V] | 1.34 |
| CCP-20CF3.F | 4.00% | | |
| CCP-40CF3 | 6.00% | | |
| CDU-2-F | 12.00% | | |
| CDU-3-F | 16.00% | | |
| CDU-5-F | 8.00% | | |
| CCOC-3-3 | 8.00% | | |
| CCOC-3-5 | 4.00% | | |

Example M49

| | | | |
|---|---|---|---|
| CCH-34 | 6.00% | S→N [° C.] | <−40 |
| CCH-501 | 10.00% | Clearing point [° C.] | +80.0 |
| CCH-5CF3 | 6.00% | Δn [589 nm, 20° C.] | +0.0653 |
| CCP-2F.F.F | 11.00% | Δε [1 kHz, 20° C.] | +9.9 |
| CCP-3F.F.F | 11.00% | d · Δn [20° C.] [μm] | 0.50 |
| CCP-5F.F.F | 6.00% | Twist [°] | 90 |
| CCP-20CF3.F | 8.00% | $V_{10}$ [V] | 1.33 |
| CCZU-2-F | 6.00% | | |
| CCZU-3-F | 14.00% | | |
| CCZU-5-F | 6.00% | | |
| DCZG-2-OT | 4.00% | | |
| DCZG-3-OT | 4.00% | | |
| DCZG-5-OT | 4.00% | | |
| CCOC-3-3 | 4.00% | | |

Example M50

| | | | |
|---|---|---|---|
| CCH-35 | 3.00% | Clearing point [° C.] | +82.0 |
| CC-5-V | 8.00% | Δn [589 nm, 20° C.] | +0.0653 |
| CCH-3CF3 | 6.00% | d · Δn [20° C.] [μm] | 0.55 |
| CCH-5CF3 | 8.00% | Twist [°] | 90 |
| CCP-2F.F.F | 10.00% | $V_{10}$ [V] | 1.54 |
| CCP-3F.F.F | 12.00% | | |
| CCP-5F.F.F | 4.00% | | |
| CCZU-2-F | 4.00% | | |
| CCZU-3-F | 14.00% | | |
| CCZU-5-F | 4.00% | | |
| CCP-20C3.F | 9.00% | | |
| CCP-30C3.F | 5.00% | | |
| CCP-20C3 | 3.00% | | |
| CCP-40C3 | 3.00% | | |
| CCOC-4-3 | 3.00% | | |
| CCOC-3-3 | 4.00% | | |

Example M51

| | | | |
|---|---|---|---|
| CCH-301 | 19.00% | Clearing point [° C.] | +95.0 |
| CCH-501 | 17.00% | Δn [589 nm, 20° C.] | +0.0607 |
| CC-5-V | 3.00% | d · Δn [20° C.] [μm] | 0.55 |
| CCP-2F.F.F | 9.00% | Twist [°] | 90 |
| CCP-3F.F.F | 7.50% | $V_{10}$ [V] | 2.10 |
| CCP-5F.F.F | 3.00% | | |
| CCZU-2-F | 4.00% | | |
| CCZU-3-F | 13.00% | | |
| CCZU-5-F | 4.00% | | |
| CCPC-33 | 2.00% | | |
| CCPC-34 | 4.00% | | |
| CCPC-35 | 4.00% | | |
| CCOC-3-3 | 3.00% | | |
| CCOC-4-3 | 4.50% | | |
| CCOC-3-5 | 3.00% | | |

Example M52

| | | | |
|---|---|---|---|
| CCH-301 | 13.00% | Clearing point [° C.] | +105.8 |
| CCH-501 | 16.00% | Δn [589 nm, 20° C.] | +0.0594 |
| CCH-34 | 5.00% | Δε [1 kHz, 20° C.] | +4.7 |
| CCP-2F.F.F | 10.00% | d · Δn [20° C.] [μm] | 0.50 |
| CCP-3F.F.F | 4.00% | Twist [°] | 90 |
| CCP-5F.F.F | 4.00% | $V_{10,0,20}$ [V] | 2.18 |
| CCZU-2-F | 5.00% | | |
| CCZU-3-F | 15.00% | | |
| CCZU-5-F | 5.00% | | |

Example M53

| | | | |
|---|---|---|---|
| CCPC-34 | 2.00% | | |
| CCPC-35 | 2.00% | | |
| CCOC-3-3 | 3.00% | | |
| CCOC-4-3 | 4.00% | | |
| CCOC-3-5 | 2.00% | | |
| CCOCC-2-3 | 3.00% | | |
| CCOCC-3-2 | 4.00% | | |
| CCOCC-2-2 | 3.00% | | |

Example M53

| | | | |
|---|---|---|---|
| CCH-301 | 14.00% | S→N [° C.] | <−40 |
| CCH-501 | 16.00% | Clearing point [° C.] | +105.5 |
| CCH-34 | 4.00% | $\Delta n$ [589.3 nm, 20° C.] | +0.0615 |
| CCP-2F.F.F | 10.00% | $\Delta \epsilon$ [1 kHz, 20° C.] | +4.7 |
| CCP-3F.F.F | 8.00% | d · $\Delta n$ [µm, 20° C.] | 0.50 |
| CCP-5F.F.F | 2.00% | Twist [°] | 90 |
| CCZU-2-F | 4.00% | $V_{10,0,20}$ [V] | 2.15 |
| CCZU-3-F | 15.00% | | |
| CCZU-5-F | 4.00% | | |
| CCPC-34 | 3.00% | | |
| CCPC-35 | 3.00% | | |
| CCOC-3-3 | 3.00% | | |
| CCOC-4-3 | 4.00% | | |
| CCOC-3-5 | 2.00% | | |
| CCOCC-2-3 | 3.00% | | |
| CCOCC-3-2 | 3.00% | | |
| CCOCC-2-2 | 2.00% | | |

Example M54

| | | | |
|---|---|---|---|
| CCH-301 | 15.00% | S→N [° C.] | <−40 |
| CCH-501 | 16.00% | Clearing point [° C.] | +104.5 |
| CCH-34 | 4.00% | $\Delta n$ [589 nm, 20° C.] | +0.0616 |
| CCP-2F.F.F | 9.00% | d · $\Delta n$ [µm, 20° C.] | 0.5 |
| CCP-3F.F.F | 5.00% | Twist [°] | 90 |
| CCP-5F.F.F | 5.00% | $V_{10,0,20}$ [V] | 2.17 |
| CCZU-2-F | 4.00% | | |
| CCZU-3-F | 15.00% | | |
| CCZU-5-F | 5.00% | | |
| CCPC-33 | 2.00% | | |
| CCPC-34 | 3.00% | | |
| CCPC-35 | 2.00% | | |
| CCOC-3-3 | 3.00% | | |
| CCOC-4-3 | 4.00% | | |
| CCOC-3-5 | 2.00% | | |
| CCOCC-2-3 | 2.00% | | |
| CCOCC-3-2 | 2.00% | | |
| CCOCC-4-3 | 2.00% | | |

Example M55

| | | | |
|---|---|---|---|
| CCH-301 | 14.00% | S→N [° C.] | <−40 |
| CCH-501 | 14.00% | Clearing point [° C.] | +104.5 |
| CCH-34 | 4.00% | $\Delta n$ [589 nm, 20° C.] | +0.0618 |
| CCP-2F.F.F | 10.00% | d · $\Delta n$ [µm, 20° C.] | 0.5 |
| CCP-3F.F.F | 8.00% | Twist [°] | 90 |
| CCP-5F.F.F | 4.00% | $V_{10,0,20}$ [V] | 2.13 |
| CCZU-2-F | 4.00% | | |
| CCZU-3-F | 14.00% | | |
| CCZU-5-F | 4.00% | | |
| CCPC-33 | 2.00% | | |
| CCPC-34 | 2.00% | | |
| CCPC-35 | 2.00% | | |
| CCOC-3-3 | 3.00% | | |

| | | | |
|---|---|---|---|
| CCOC-4-3 | 4.00% | | |
| CCOC-3-5 | 2.00% | | |
| CH-43 | 2.00% | | |
| CH-45 | 3.00% | | |
| CCOCC-3-2 | 2.00% | | |
| CCOCC-2-3 | 2.00% | | |

Example M56

| | | | |
|---|---|---|---|
| CCH-301 | 18.50% | Clearing point [° C.] | +100.0 |
| CCH-501 | 14.00% | $\Delta n$ [589 nm, 20° C.] | +0.0608 |
| CC-5-V | 3.00% | d · $\Delta n$ [µm, 20° C.] | 0.55 |
| CCP-2F.F.F | 9.00% | Twist [°] | 90 |
| CCP-3F.F.F | 7.00% | $V_{10,0,20}$ [V] | 2.17 |
| CCP-5F.F.F | 3.00% | | |
| CCZU-2-F | 4.00% | | |
| CCZU-3-F | 13.00% | | |
| CCZU-5-F | 4.00% | | |
| CCPC-33 | 2.00% | | |
| CCPC-34 | 3.00% | | |
| CCPC-35 | 3.00% | | |
| CCOC-3-3 | 3.00% | | |
| CCOC-4-3 | 4.00% | | |
| CCOC-3,5 | 3.00% | | |
| CH-35 | 2.50% | | |
| CH-43 | 2.00% | | |
| CH-45 | 2.00% | | |

Example M57

| | | | |
|---|---|---|---|
| CCH-301 | 22.00% | Clearing point [° C.] | +105.0 |
| CCH-501 | 13.00% | $\Delta n$ [589 nm, 20° C.] | +0.0612 |
| CCP-2F.F.F | 5.60% | d · $\Delta n$ [µm, 20° C.] | 0.55 |
| CCP-3F.F.F | 7.50% | Twist [°] | 90 |
| CCP-5F.F.F | 4.00% | $V_{10,0,20}$ [V] | 2.21 |
| CCZU-2-F | 3.80% | | |
| CCZU-3-F | 12.50% | | |
| CCZU-5-F | 4.60% | | |
| CCPC-33 | 2.50% | | |
| CCPC-34 | 2.90% | | |
| CCPC-35 | 3.10% | | |
| CCOC-3-3 | 2.85% | | |
| CCOC-4-3 | 4.45% | | |
| CCOC-3-5 | 2.20% | | |
| CH-33 | 1.00% | | |
| CH-35 | 1.50% | | |
| CH-43 | 2.00% | | |
| CH-45 | 2.50% | | |
| CCOCC-3-2 | 1.00% | | |
| CCOCC-2-3 | 1.00% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium which is a mixture of polar compounds having positive dielectric anisotropy, comprising at least one compound of formula IA

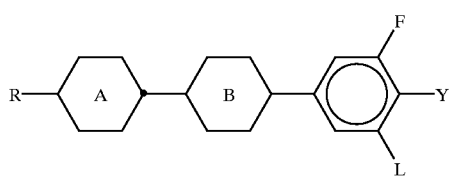

IA and one or more compounds of formula IB

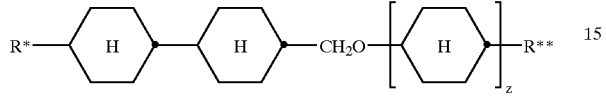

IB where
R, R* and R** each, independently of one another, are an alkyl or alkenyl radical having from 1 to 12 C atoms which is unsubstituted, singly substituted by CN or CF$_3$ or at least singly substituted by halogen, with the additional option of one or more CH$_2$ groups in these radicals, independently of one another in each case, being replaced by —O—, —S—,

—CO—, —CO—O—, —O—CO— or —O—CO—O— in such a way that O atoms are not directly linked together, and

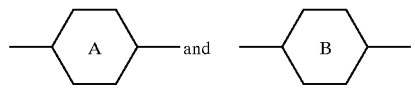

each, independently of one another, are

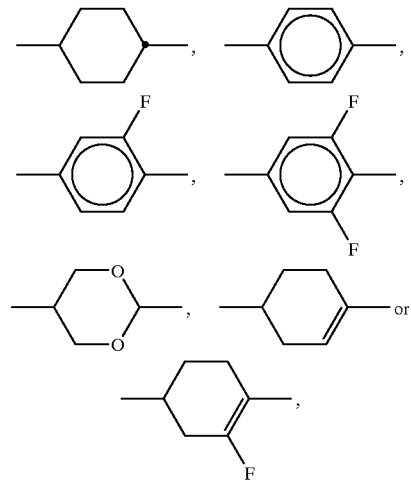

L is H or F, and
Y is F, Cl, CN, halogentated alkyl, halogenated alkenyloxy, halogenated alkoxy or halogenated alkenyl having up to 9 C atoms, and
z is 1 or 2.

2. The medium according to claim 1, further comprising at least one compound of formulae II, III, IV, V, VI, VII or VIII:

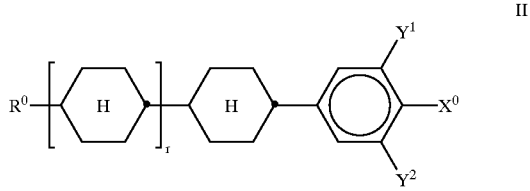

II

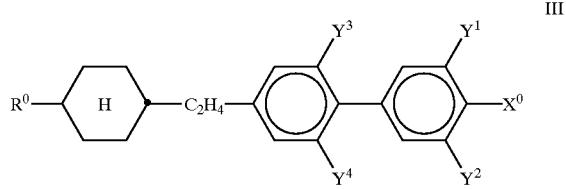

III

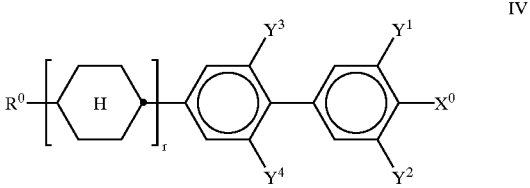

IV

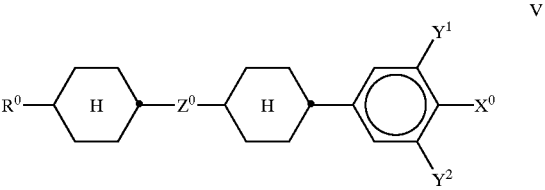

V

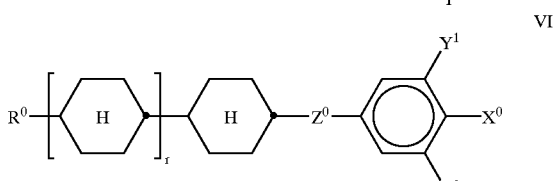

VI

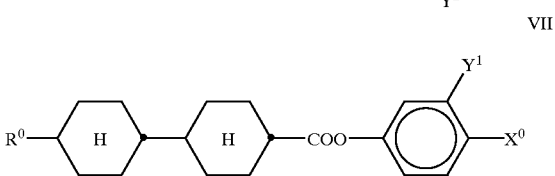

VII

VIII

where the individual radicals have the following meanings:
R$^0$: n-alkyl, oxaalkyl, fluoroalkyl, alkenyloxy or alkenyl each having up to 9 C atoms,
X$^0$: F, Cl, halogenated alkyl, alkenyl or alkoxy having from 1 to 6 C atoms,
Z$^0$: —C$_2$H$_4$—, —CF=CF—, —CH$_2$O—, —OCH$_2$—, —CF$_2$O—, —OCF$_2$— or —C$_4$F$_4$—,
Y$^1$ to Y$^4$: each, independently of one another, H or F,
r: 0 or 1, the compounds of the formulae II and IV not being identical with the compounds of the formula IA.

3. The medium according to claim 2, wherein the proportion of compounds of the formulae IA and IB jointly in the mixture as a whole is at least from 10 to 100 wt %.

4. The medium according to claim 2, wherein the proportion of compounds of the formulae II to VIII in the mixture as a whole is from 10 to 50 wt %.

5. The medium according to claim 1, wherein the mixture comprises two or three compounds of the formula IB.

6. The medium according to claim 1, further comprising at least one compound of formulae RI to RV

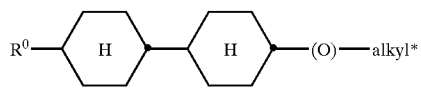
RI

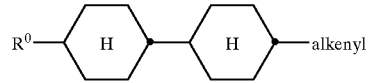
RII

RIII

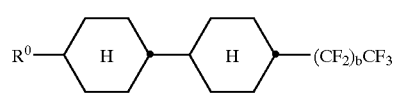
RIV

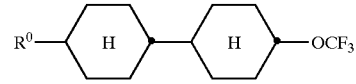
RV where
- $R^0$: n-alkyl, oxaalkyl, fluoroalkyl, alkenyloxy or alkenyl each having up to 9 C atoms,
- b: 0, 1 or 2,
- alkyl and alkyl*: are each independently straight-chain or branched alkyl groups having from 1 to 9 carbon atoms, and
- alkenyl and alkenyl*: are each independently straight-chain or branched alkenyl groups having from 2 to 9 carbon atoms.

7. The medium according to claim 2, wherein $X^0$ is F or $OCF_3$, and $Y^2$ is H or F.

8. The medium according to claim 1, wherein the compound of the formula IA, L=F.

9. The medium according to claim 1, wherein Y in the compound of the formula IA is
F, Cl, CN, $CF_3$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2H$, $OCF_2CF_2CFH_2$, $OCFHCF_2CF_3$, $OCFHCF_2CH_2H$, $OCF_2CF_2CF_3$, $OCF_2CHFCF_3$, $OCClFCF_2CF_3$ or $OCH{=}CF_2$.

10. A compound of formula IB

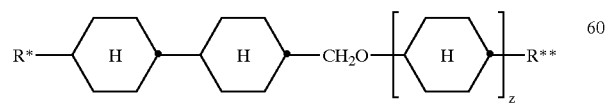
IB where
R* and R** are each independently an alkyl or alkenyl radical having from 1 to 12 C atoms which is unsubstituted, singly substituted by CN or $CF_3$ or at least singly substituted by halogen, with the additional option of one or more $CH_2$ groups in these radicals, independently of one another in each case, being replaced by —O—, —S—,

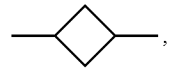,

—CO—, —CO—O—, —O—CO— or —O—CO—O— in such a way that O atoms are not directly linked together, and
iz s 1 or 2.

11. An electro-optical device comprising the liquid-crystalline medium according to claim 1.

12. An electro-optical liquid crystal display comprising a liquid-crystalline medium according to claim 1.

13. The medium according to claim 1, wherein the medium has 5–95 weight percent of compounds of the formula IA and IB.

14. The medium according to claim 1, wherein the compound of the general formula IA is

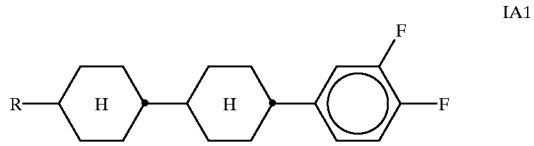
IA1

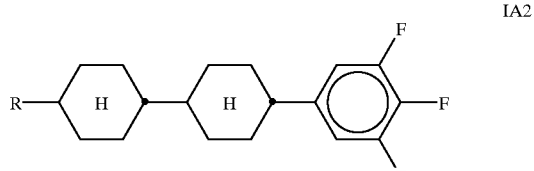
IA2

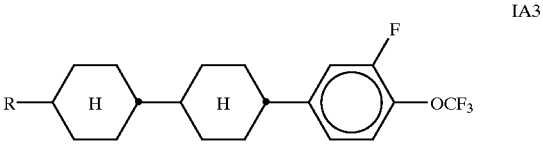
IA3

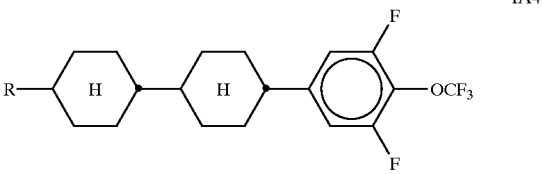
IA4

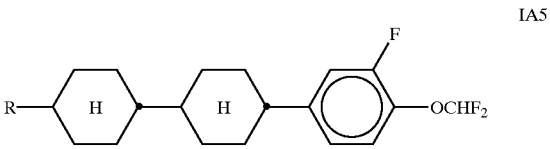
IA5

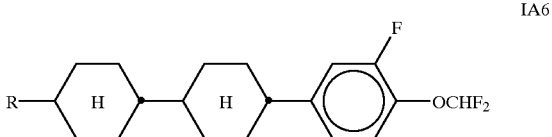
IA6

-continued

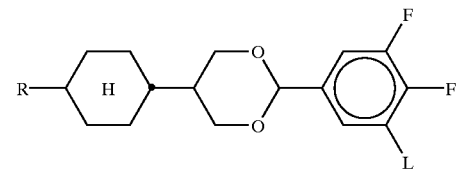
IA7

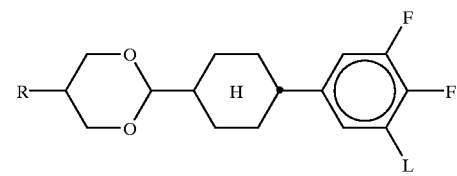
IA8

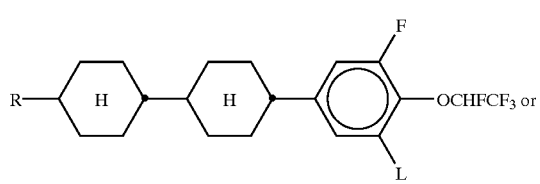
IA9

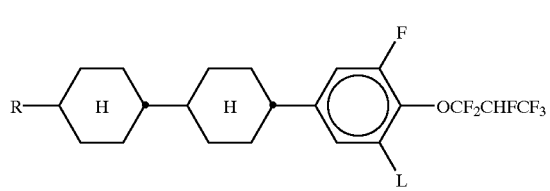
IA10

15. The medium according to claim 1, wherein the compound of the general formula IB is

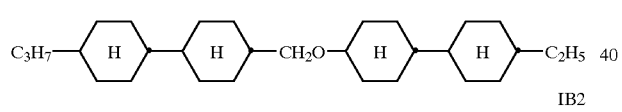
IB1

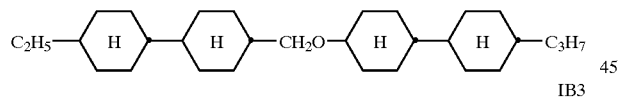
IB2

IB3

IB4

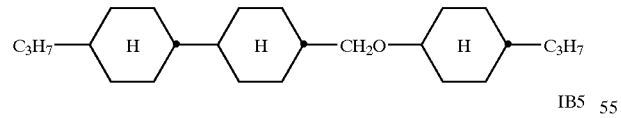
IB5

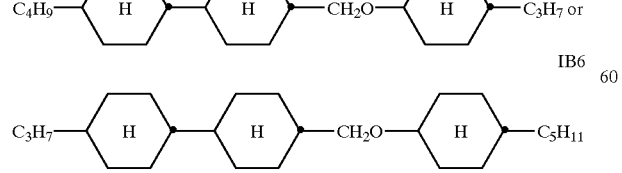
IB6

16. The medium according to claim 1, further comprising at least one compound of formulae IX to XVI:

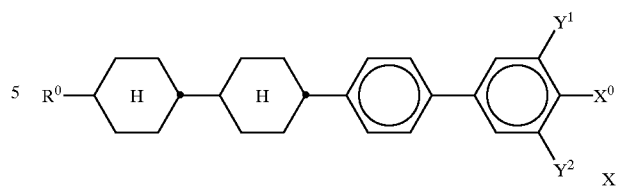
IX

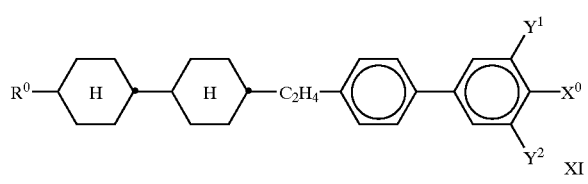
X

XI

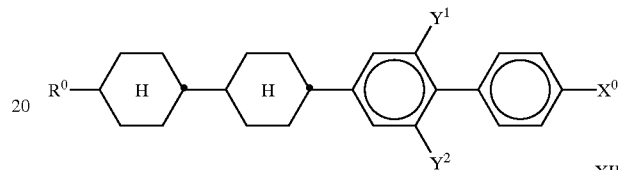
XII

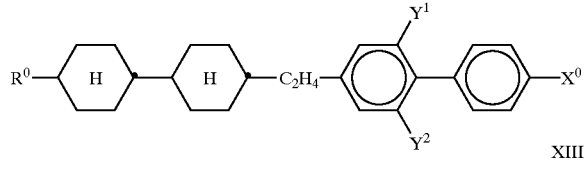
XIII

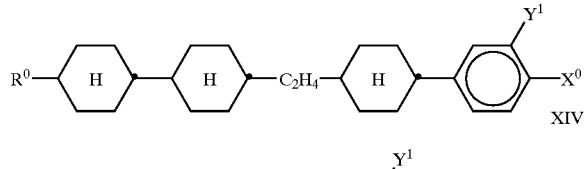
XIV

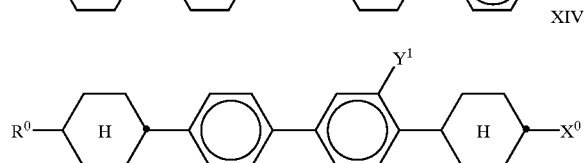
XV

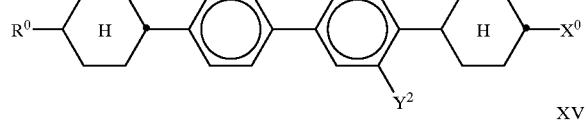
XVI

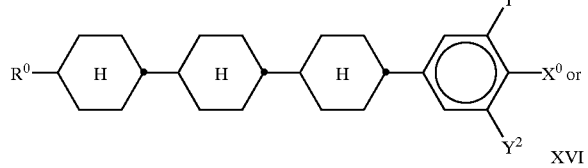

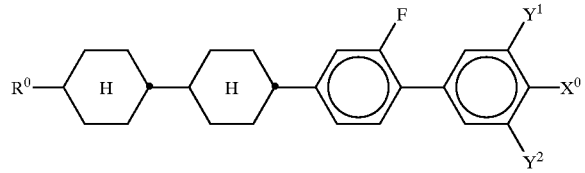

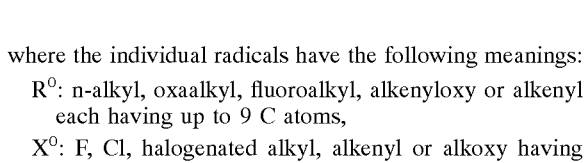

where the individual radicals have the following meanings:

$R^0$: n-alkyl, oxaalkyl, fluoroalkyl, alkenyloxy or alkenyl each having up to 9 C atoms, $X^0$: F, Cl, halogenated alkyl, alkenyl or alkoxy having from 1 to 6 C atoms, $Y^1$ to $Y^2$: each, independently of one another, H or F.

17. The medium according to claim 1, further comprising at least one compound of formulae

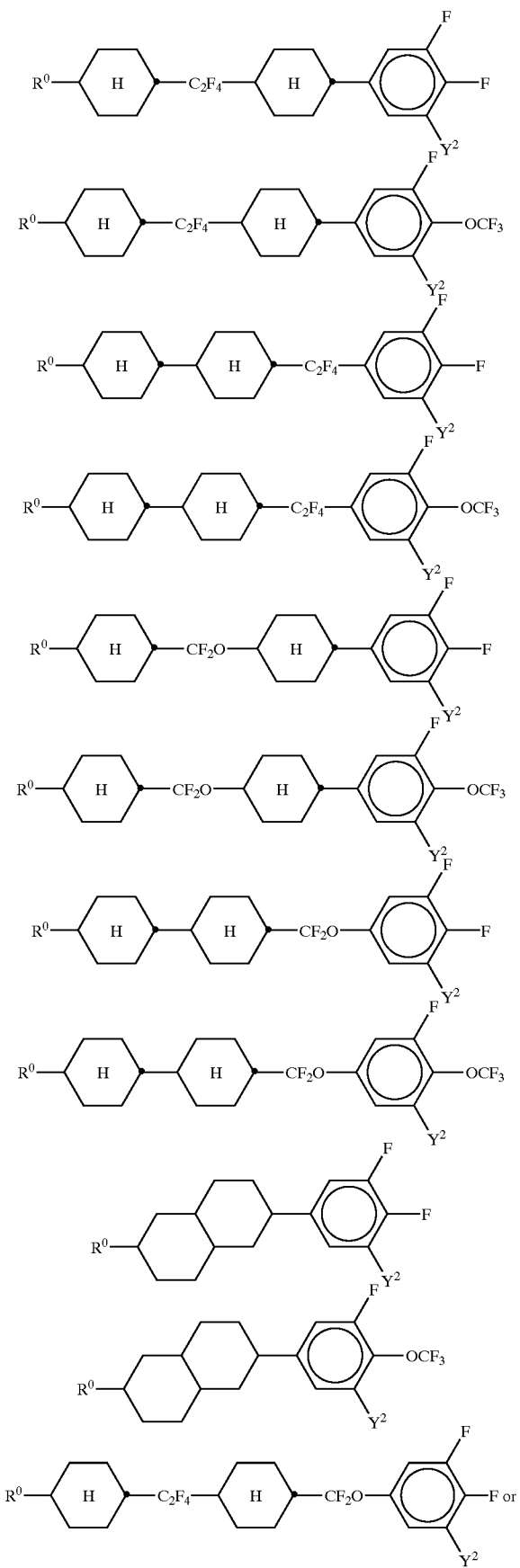

-continued

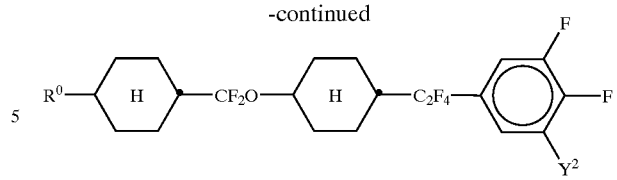

wherein R⁰ is straight-chain alkyl or alkenyl having from 2 to 7 C atoms, and $Y^2$ is H or F.

18. The medium according to claim 1, further comprising at least one compound of formulae:

XVII

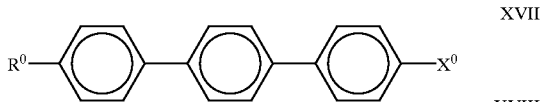

XVIII

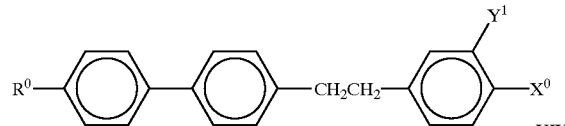

XIX

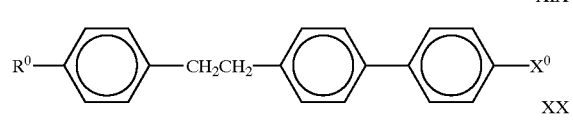

XX

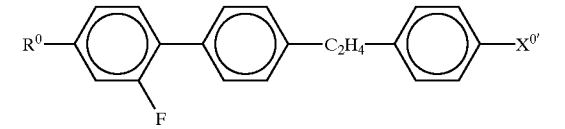

($X^{0'}$ = F or Cl)

wherein

R⁰: n-alkyl, oxaalkyl, fluoroalkyl, alkenyloxy or alkenyl each having up to 9 C atoms;

X⁰: F, Cl, halogenated alkyl, alkenyl or alkoxy having from 1 to 6 C atoms; and $Y^1$: H or F.

19. The medium according to claim 6, having 5–60 wt % of compounds of formulae RI, RII or RIII.

20. A liquid crystalline medium comprising at least one compound which is

IA1

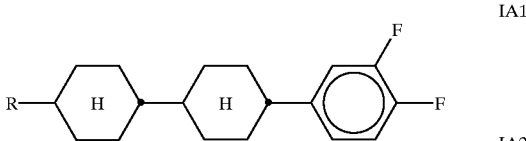

IA2

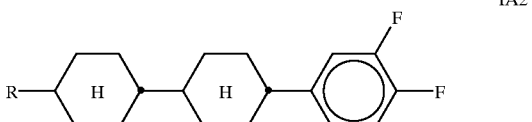

IA3

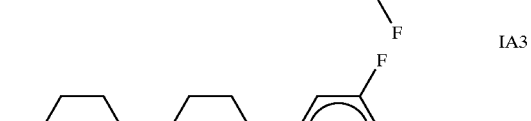

-continued

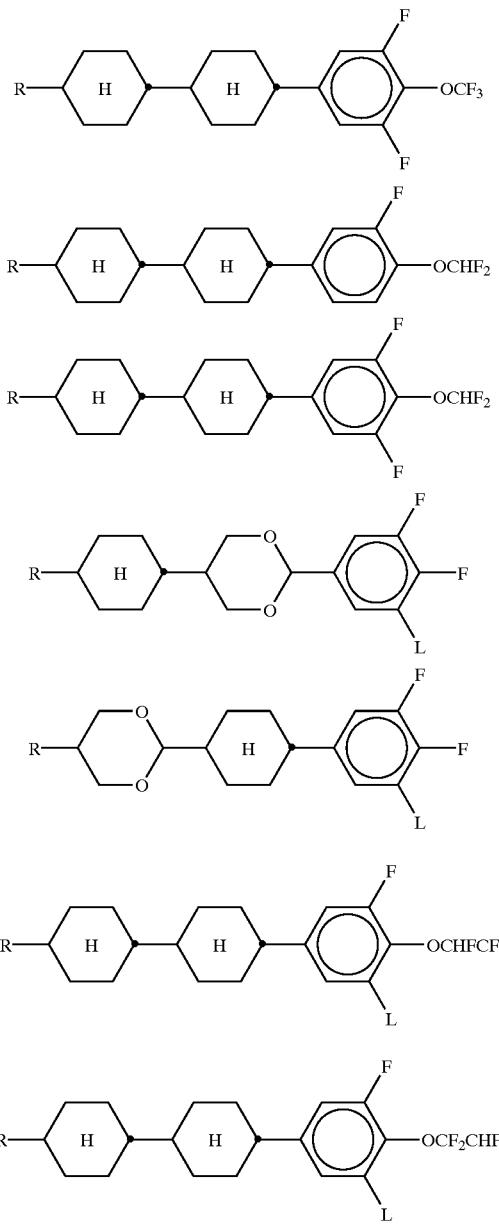

R, is an alkyl or alkenyl radical having from 1 to 12 C atoms which is unsubstituted, singly substituted by CN or $CF_3$ or at least singly substituted by halogen, with the additional option of one or more $CH_2$ groups; independently of one another in each case, being replaced by —O—, —S—,

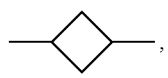

—CO—, —CO—O—, —O—CO— or —O—CO—O— in such a way that O atoms are not directly linked together, and

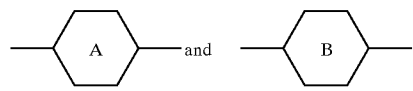

each, independently of one another, are

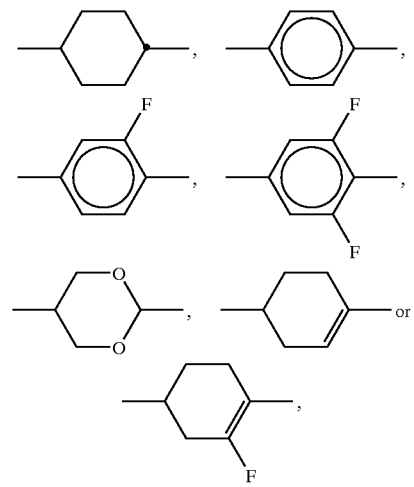

and

L is H or F, and at least one compound which is

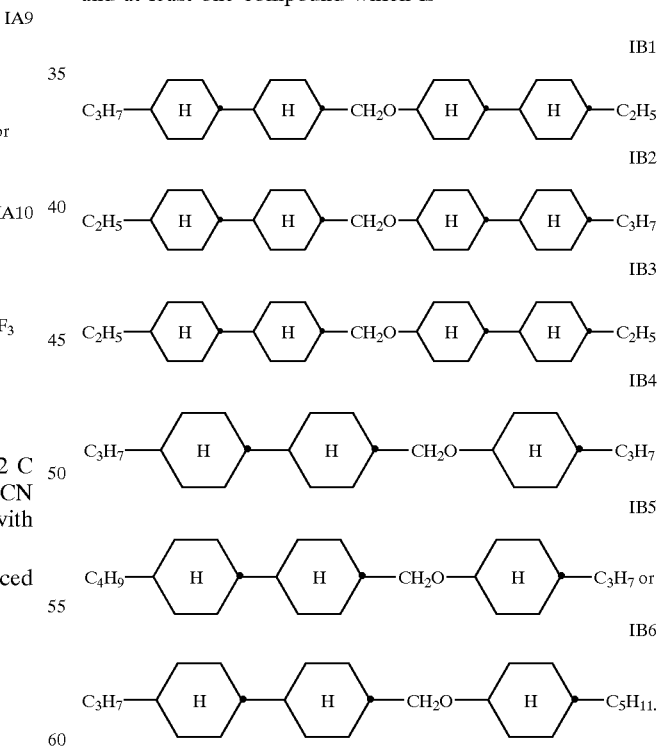

* * * * *

UNITED STATES PATENT AND TRADEMARK OFFICE
CERTIFICATE OF CORRECTION

PATENT NO. : 6,465,059 B1
DATED : October 15, 2002
INVENTOR(S) : Matthias Bremer et al.

It is certified that error appears in the above-identified patent and that said Letters Patent is hereby corrected as shown below:

Column 53,
Line 64, reads "halogentated alkyl," should read -- halogenated alkyl, --

Column 55,
Line 54, reads "OCFHCF2CH2H," should read -- OCFHCF2CF2H, --

Column 56,
Line 16, reads "iz s 1 or 2." should read -- z is 1 or 2. --

Signed and Sealed this

Sixteenth Day of September, 2003

JAMES E. ROGAN
*Director of the United States Patent and Trademark Office*